US012795617B2

(12) United States Patent
Gao et al.

(10) Patent No.: US 12,795,617 B2
(45) Date of Patent: Nov. 10, 2026

(54) SIGNALING OF MULTI-TRP SCHEMES IN A WIRELESS COMMUNICATION SYSTEM

(71) Applicant: Telefonaktiebolaget LM Ericsson (publ), Stockholm (SE)

(72) Inventors: Shiwei Gao, Nepean (CA); Siva Muruganathan, Stittsville (CA); Mattias Frenne, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 323 days.

(21) Appl. No.: 17/772,412

(22) PCT Filed: Nov. 6, 2020

(86) PCT No.: PCT/SE2020/051067
§ 371 (c)(1),
(2) Date: Apr. 27, 2022

(87) PCT Pub. No.: WO2021/091466
PCT Pub. Date: May 14, 2021

(65) Prior Publication Data

US 2022/0394708 A1 Dec. 8, 2022

Related U.S. Application Data

(60) Provisional application No. 62/932,856, filed on Nov. 8, 2019.

(51) Int. Cl.
*H04W 72/0446* (2023.01)
*H04L 5/00* (2006.01)

(52) U.S. Cl.
CPC ....... *H04W 72/0446* (2013.01); *H04L 5/0014* (2013.01); *H04L 5/0048* (2013.01)

(58) Field of Classification Search
CPC .. H04W 72/0446; H04L 5/0044; H04L 5/014; H04L 5/0048; H04L 5/0023; H04L 5/0051
See application file for complete search history.

(56) References Cited

U.S. PATENT DOCUMENTS 11,991,701 B2 * 5/2024 Khoshnevisan ..... H04B 7/0417
12,407,459 B2 * 9/2025 Chen ....................... H04J 13/16
(Continued)

FOREIGN PATENT DOCUMENTS

CN 109964434 A 7/2019
WO 2019083426 A1 5/2019

OTHER PUBLICATIONS

Office Action for Chinese Patent Application No. 202080079620.2 dated Mar. 29, 2024, 11 pages.
International Search Report and Written Opinion of the International Searching Authority for PCT International Application No. PCT/SE2020/051067 dated Feb. 9, 2021.
(Continued)

*Primary Examiner* — Kenny S Lin
*Assistant Examiner* — Roderick Mak
(74) *Attorney, Agent, or Firm* — Sage Patent Group

(57) ABSTRACT

A method of operating a wireless device in a communication network is described. The method includes obtaining a list of time domain resource allocations, TDRAs, from a network node of the communication network. The method also includes receiving downlink control information, DCI, scheduling a physical downlink shared channel, PDSCH, for reception by the wireless device and selecting a TDRA from the list of TDRAs based on the received DCI. The method further includes determining a PDSCH transmission scheme including one or more transmission points, TRPs, based on a number of PDSCH transmission repetitions configured for the selected TDRA.

23 Claims, 19 Drawing Sheets

Wireless Device UE Operations

(56) References Cited

U.S. PATENT DOCUMENTS

| | | | | |
|---|---|---|---|---|
| 2018/0042028 | A1* | 2/2018 | Nam | H04L 5/0035 |
| 2018/0227156 | A1* | 8/2018 | Papasakellariou | H04W 72/0453 |
| 2018/0324768 | A1 | 11/2018 | Shaheen et al. | |
| 2019/0149365 | A1* | 5/2019 | Chatterjee | H04W 76/11 370/329 |
| 2019/0261407 | A1 | 8/2019 | Irukulapati et al. | |
| 2020/0015200 | A1* | 1/2020 | Vilaipornsawai | H04W 72/23 |
| 2020/0053757 | A1* | 2/2020 | Bagheri | H04L 5/10 |
| 2020/0092068 | A1* | 3/2020 | Yang | H04L 1/1858 |
| 2020/0106566 | A1* | 4/2020 | Yeo | H04L 1/1854 |
| 2020/0267750 | A1* | 8/2020 | Park | H04B 7/024 |
| 2020/0314816 | A1* | 10/2020 | Yi | H04L 5/0094 |
| 2020/0389897 | A1* | 12/2020 | Mondal | H04L 5/0044 |
| 2021/0112563 | A1* | 4/2021 | Hua | H04L 5/0094 |
| 2021/0226740 | A1* | 7/2021 | Lei | H04L 1/1864 |
| 2021/0321446 | A1* | 10/2021 | Lee | H04W 72/54 |
| 2022/0103325 | A1* | 3/2022 | Chen | H04L 5/0023 |
| 2023/0164782 | A1* | 5/2023 | Kim | H04W 72/23 370/329 |

OTHER PUBLICATIONS

Panasonic, "On multi-TRP enhancements for NR MIMO in Rel. 16," R1-1910523, 3GPP TSG RAN WG1 #98bis, Chongqing, China, Oct. 14-20, 2019, 11 pages.

Qualcomm Incorporated, "Multi-TRP Enhancements," R1-1911126, 3GPP TSG-RAN WG1 Meeting #98bis, Chongqing, China, Oct. 14-20, 2019, 26 pages.

Ericsson, "On multi-TRP and multi-panel," R1-1904750, 3GPP TSG RAN WG1 Meeting Ran1#96-bis, Xi'an, China, Apr. 8-12, 2019, 18 pages.

3GPP TS 38.214 V15.6.0, "3rd Generation Partnership Project; Technical Specification Group Radio Access Network; NR; Physical layer procedures for data (Release 15)," Jun. 2019, 105 pages.

First Examination Report for Indian Patent Application No. 202217027453 dated Sep. 13, 2022.

Notice of Allowance for Chinese Patent Application No. 202080079620.2 dated Jan. 13, 2025, 4 pages.

European Search Report for European Patent Application No. 25179637.1 dated Sep. 25, 2025, 10 pages.

Huawei, HiSilicon, "Feature Summary of Enhancements on Multi-TRP/Panel Transmission," R1-1911425, 3GPP TSG RAN WG1 Meeting #98bis, Chongqing, China, Oct. 14-20, 2019, 100 pages.

* cited by examiner

Wireless Device UE Operations

Radio Access Network (RAN)
Node Operations

SIGNALING OF MULTI-TRP SCHEMES IN A WIRELESS COMMUNICATION SYSTEM

CROSS REFERENCE TO RELATED APPLICATIONS

This application is a 35 U.S.C. § 371 national stage application of PCT International Application No. PCT/SE2020/051067 filed on Nov. 6, 2020, which claims the benefit of U.S. Provisional Patent Application Ser. No. 62/932,856, filed on Nov. 8, 2019, the disclosures and content of which are incorporated by reference herein in their entireties.

TECHNICAL FIELD

The present disclosure relates generally to communications, and more particularly to communication methods and related devices and nodes supporting wireless communications.

BACKGROUND

The new generation mobile wireless communication system (5G) or new radio (NR) supports a diverse set of use cases and a diverse set of deployment scenarios. NR uses CP-OFDM (Cyclic Prefix Orthogonal Frequency Division Multiplexing) in the downlink (i.e. from a network node, gNB, eNB, or base station, to a user equipment or UE) and both CP-OFDM and DFT-spread OFDM (DFT-S-OFDM) in the uplink (i.e. from UE to gNB). In the time domain, NR downlink and uplink physical resources are organized into equally-sized subframes of 1 ms each. A subframe is further divided into multiple slots of equal duration.

The slot length depends on subcarrier spacing. For subcarrier spacing of $\Delta f=15$ kHz, there is only one slot per subframe, and each slot always consists of 14 OFDM symbols, irrespectively of the subcarrier spacing.

Typical data scheduling in NR are per slot basis, an example is shown in FIG. 1 where the first two symbols contain physical downlink control channel (PDCCH) and the remaining 12 symbols contains physical data channel (PDCH), either a PDSCH (physical downlink data channel) or PUSCH (physical uplink data channel).

Different subcarrier spacing values are supported in NR. The supported subcarrier spacing (SCS) values (also referred to as different numerologies) are given by $\Delta f=(15\times 2^{\alpha})$ kHz where $\alpha \in (0,1,2,4,8)$. $\Delta f=15$ kHz is the basic subcarrier spacing that is also used in LTE, the corresponding slot duration is 1 ms. For a given SCS, the corresponding slot duration is $$\frac{1}{2^{\alpha}}$$

ms.

In the frequency domain physical resource definition, a system bandwidth or a bandwidth part (BWP) is divided into resource blocks (RBs), each corresponds to 12 contiguous subcarriers. The basic NR physical time-frequency resource grid is illustrated in FIG. 2, where only one resource block (RB) within a 14-symbol slot is shown. One OFDM subcarrier during one OFDM symbol interval forms one resource element (RE).

Downlink transmissions can be dynamically scheduled, i.e., in each slot the gNB transmits downlink control information (DCI) over PDCCH about which UE data is to be transmitted to and which RBs and OFDM symbols in an indicated downlink slot the data is transmitted on. PDCCH is typically transmitted in the first few OFDM symbols in each slot in NR. The UE data are carried on PDSCH. A UE first detects and decodes PDCCH and if the decoding is successfully, it then decodes the corresponding PDSCH based on the decoded control information in the PDCCH. Uplink data transmission can also be dynamically scheduled using PDCCH. Similar to downlink, a UE first decodes uplink grants in PDCCH and then transmits data over PUSCH based the decoded control information in the uplink grant such as modulation order, coding rate, uplink resource allocation, etc.

In some situations, a gNB may need to dynamically switch between different PDSCH transmission schemes since some traffic needs to be received with high reliability while others can be received with normal reliability but with higher spectral efficiency. Thus, a need exists for the gNB to dynamically switch between different PDSCH transmission schemes when scheduling a UE for PDSCH reception.

SUMMARY

According to some embodiments of the present disclosure, a method of operating a wireless device in a communication network is described. The method includes obtaining a list of time domain resource allocations, TDRAs, from a network node of the communication network. The method also includes receiving downlink control information, DCI, scheduling a physical downlink shared channel, PDSCH, for reception by the wireless device and selecting a TDRA from the list of TDRAs based on the received DCI. The method further includes determining a PDSCH transmission scheme including one or more transmission points, TRPs, based on a number of PDSCH transmission repetitions configured for the selected TDRA. A wireless device comprising processing circuitry and memory coupled with the processing circuitry that includes instructions that when executed by the processing circuitry causes the wireless device to perform operations according to the method is also described.

A method of operating a radio access network node, RAN, in a communication network according to some embodiments of the present disclosure is also described. The method includes providing a list of time domain resource allocations, TDRAs, to a wireless device operating in the communication network, each TDRA comprising information indicating a number of PDSCH transmission repetitions configured for the selected TDRA. The method also includes transmitting downlink control information, DCI, for scheduling a physical downlink shared channel, PDSCH, for reception by the wireless device, the DCI indicating which TDRA from the list of TDRAs the wireless device is to select to receive the PDSCH transmissions from one or more transmission points, TRPs, operating in the communication network. The method further includes scheduling the PDSCH transmissions from the one or more TRPs according to a PDSCH transmission scheme associated with the TDRA indicated by the DCI. A RAN node comprising processing circuitry and memory coupled with the processing circuitry that includes instructions that when executed by the processing circuitry causes the RAN node to perform operations according to the method is also described.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 3:
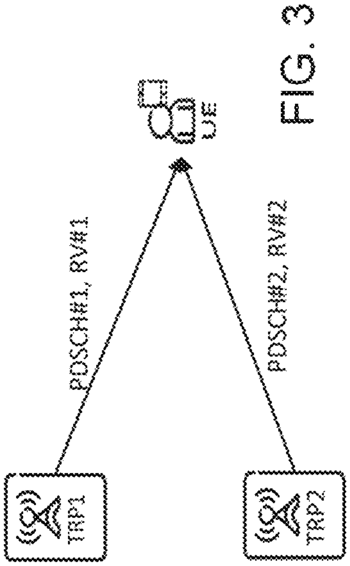
FIG. 3 is a block diagram illustrating an example of data transmission over multiple TRPs for increasing reliability according to some embodiments of inventive concepts.

FIG. 3 is a block diagram illustrating elements of a wireless device UE 900 (also referred to as a mobile terminal, a mobile communication terminal, a wireless communication device, a wireless terminal, mobile device, a wireless communication terminal, user equipment, UE, a user equipment node/terminal/device, etc.) configured to provide wireless communication according to embodiments of inventive concepts. (Wireless device 900 may be provided, for example, as discussed below with respect to wireless device QQ110 of FIG. 17.) As shown, wireless device UE may include an antenna 904 (e.g., corresponding to antenna QQ111 of FIG. 17), and transceiver circuitry 902 (also referred to as a transceiver, e.g., corresponding to interface QQ114 of FIG. 17) including a transmitter and a receiver configured to provide uplink and downlink radio communications with a base station(s) (e.g., corresponding to network node QQ160 of FIG. 17, also referred to as a RAN node) of a radio access network. Wireless device UE may also include processing circuitry 906 (also referred to as a processor, e.g., corresponding to processing circuitry QQ120 of FIG. 17) coupled to the transceiver circuitry, and memory circuitry 908 (also referred to as memory, e.g., corresponding to device readable medium QQ130 of FIG. 17) coupled to the processing circuitry. The memory circuitry 908 may include computer readable program code that when executed by the processing circuitry 906 causes the processing circuitry to perform operations according to embodiments disclosed herein. According to other embodiments, processing circuitry 906 may be defined to include memory so that separate memory circuitry is not required. Wireless device UE may also include an interface (such as a user interface) coupled with processing circuitry 906, and/or wireless device UE may be incorporated in a vehicle.

As discussed herein, operations of wireless device UE may be performed by processing circuitry 906 and/or transceiver circuitry 902. For example, processing circuitry 906 may control transceiver circuitry 902 to transmit communications through transceiver circuitry 902 over a radio interface to a radio access network node (also referred to as a base station) and/or to receive communications through transceiver circuitry 902 from a RAN node over a radio interface. Moreover, modules may be stored in memory circuitry 908, and these modules may provide instructions so that when instructions of a module are executed by processing circuitry 906, processing circuitry 906 performs respective operations (e.g., operations discussed below with respect to Example Embodiments relating to wireless devices).

Figure 10:
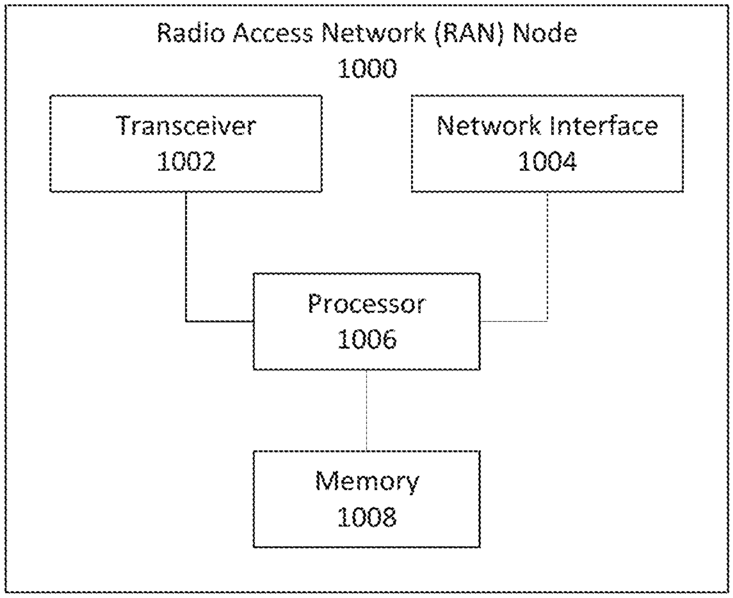
FIG. 10 is a block diagram illustrating a radio access network RAN node (e.g., a base station eNB/gNB) according to some embodiments of inventive concepts.

FIG. 10 is a block diagram illustrating elements of a radio access network RAN node 1000 (also referred to as a network node, base station, eNodeB/eNB, gNodeB/gNB, etc.) of a Radio Access Network (RAN) configured to provide cellular communication according to embodiments of inventive concepts. (RAN node 1000 may be provided, for example, as discussed below with respect to network node QQ160 of FIG. 17.) As shown, the RAN node may include transceiver circuitry 1002 (also referred to as a transceiver, e.g., corresponding to portions of interface QQ190 of FIG. 17) including a transmitter and a receiver configured to provide uplink and downlink radio communications with mobile terminals. The RAN node may include network interface circuitry 1004 (also referred to as a network interface, e.g., corresponding to portions of interface QQ190 of FIG. 17) configured to provide communications with other nodes (e.g., with other base stations) of the RAN and/or core network CN. The network node may also include processing circuitry 1002 (also referred to as a processor, e.g., corresponding to processing circuitry QQ170) coupled to the transceiver circuitry, and memory circuitry 1008 (also referred to as memory, e.g., corresponding to device readable medium QQ180 of FIG. 17) coupled to the processing circuitry. The memory circuitry 1008 may include computer readable program code that when executed by the processing circuitry 1006 causes the processing circuitry to perform operations according to embodiments disclosed herein. According to other embodiments, processing circuitry 1006 may be defined to include memory so that a separate memory circuitry is not required.

As discussed herein, operations of the RAN node may be performed by processing circuitry 1006, network interface 1004, and/or transceiver 1002. For example, processing circuitry 1006 may control transceiver 1002 to transmit downlink communications through transceiver 1002 over a radio interface to one or more mobile terminals UEs and/or to receive uplink communications through transceiver 1002 from one or more mobile terminals UEs over a radio interface. Similarly, processing circuitry 1006 may control network interface 1004 to transmit communications through network interface 1004 to one or more other network nodes and/or to receive communications through network interface from one or more other network nodes. Moreover, modules may be stored in memory 1008, and these modules may provide instructions so that when instructions of a module are executed by processing circuitry 1006, processing circuitry 1006 performs respective operations (e.g., operations discussed below with respect to Example Embodiments relating to RAN nodes).

When the UE is scheduled to receive PDSCH by a DCI, the Time domain resource (TDRA) assignment field value m of the DCI provides a row index m+1 to an allocation table. The determination of the used resource allocation table is defined in sub-clause 5.1.2.1.1 of 3GPP TS 38.214 v15.6.0. When a DCI is detected in a UE specific search space for PDCCH, the PDSCH time domain resource allocation is according to an RRC configured TDRA list by an RRC parameter pdsch-TimeDomainAllocationList provided in a UE specific PDSCH configuration, pdsch-Config. Each TDRA entry in the TDRA list defines a slot offset KO between the PDSCH and the PDCCH scheduling the PDSCH, a start and length indicator SLIV, and the PDSCH mapping type (either Type A or Type B) to be assumed in the PDSCH reception. An example of TDRA entries in a TDRA list is shown in Table 1.

TABLE 1

An example of TDRA entries configured by pdsch-TimeDomainAllocationList.

| Row index | PDSCH mapping type | $K_0$ | Start Symbol And Length (SLIV) |
|---|---|---|---|
| 1 | Type A | 0 | SLIV1 |
| 2 | Type A | 0 | SLIV2 |
| 3 | Type A | 0 | SLIV3 |
| 4 | Type A | 0 | SLIV4 |
| 5 | Type A | 0 | SLIV5 |
| 6 | Type A | 0 | SLIV6 |
| 7 | Type B | 1 | SLIV7 |
| 8 | Type B | 1 | SLIV8 |
| | | . . . | |
| N | Type B | 1 | SLIV16 |

Demodulation reference signals (DMRS) are used for coherent demodulation of physical layer data channels, PDSCH (DL) and PUSCH (UL), as well as of physical layer downlink control channel PDCCH. The DMRS is confined to resource blocks carrying the associated physical layer data channel and is mapped on allocated resource elements (REs) of the OFDM time-frequency grid in NR such that the receiver can efficiently handle time/frequency-selective fading radio channels. A PDSCH or PUSCH can have one or multiple DMRS, each associated with an antenna port. Thus, a DMRS is also referred to a DMRS port. DMRS ports used for PDSCH or PUSCH are indicated in DCI scheduling the PDSCH or PUSCH.

The mapping of DMRS to REs is configurable in both frequency and time domain, with two mapping types in the frequency domain (configuration type 1 or type 2). The REs in frequency domain are grouped into CDM groups, each contains a subset of subcarriers. The DMRS mapping in time domain can be single-symbol based or double-symbol based where the latter means that DMRS is mapped in pairs of two adjacent symbols.

A DMRS antenna port is mapped to the resource elements within one CDM group only. For single-symbol DMRS, two antenna ports can be mapped to each CDM group whereas for double-symbol DMRS four antenna ports can be mapped to each CDM group. Hence, the maximum number of DMRS ports for DMRS type 1 is either four or eight. The maximum number of DMRS ports for DM-RS type 2 it is either six or twelve. The mapping between a DMRS port and a CDM group is shown in Table 2a for type 1 DMRS and Table 2b for type 2 DMRS.

TABLE 2a

| PDSCH DM-RS port p and the associated CDM group for configuration type 1. | |
|---|---|
| p | CDM group λ |
| 1000 | 0 |
| 1001 | 0 |
| 1002 | 1 |
| 1003 | 1 |
| 1004 | 0 |
| 1005 | 0 |
| 1006 | 1 |
| 1007 | 1 |

TABLE 2b

| PDSCH DM-RS port p and the associated CDM group for configuration type 2. | |
|---|---|
| p | CDM group λ |
| 1000 | 0 |
| 1001 | 0 |
| 1002 | 1 |
| 1003 | 1 |
| 1004 | 2 |
| 1005 | 2 |
| 1006 | 0 |
| 1007 | 0 |
| 1008 | 1 |
| 1009 | 1 |
| 1010 | 2 |
| 1011 | 2 |

Several signals can be transmitted from different antenna ports of the same base station. These signals can have the same large-scale properties, for instance in terms of Doppler shift/spread, average delay spread, or average delay, when measured at the receiver. These antenna ports are then said to be quasi co-located (QCL). The network can then signal to the UE that two antenna ports are QCL. If the UE knows that two antenna ports are QCL with respect to a certain parameter (e.g. Doppler spread), the UE can estimate that parameter based on a reference signal transmitted one of the antenna ports and use that estimate when receiving another reference signal or physical channel the other antenna port. Typically, the first antenna port is represented by a measurement reference signal such as CSI-RS (known as source RS) and the second antenna port is a demodulation reference signal (DMRS) (known as target RS) for PDSCH or PDCCH reception.

In NR, a QCL relationship between a DMRS port in PDSCH and other reference signals is described by a TCI state. A UE can be configured through RRC signaling with M TCI states, where M is up to 128 in frequency range 2 (FR2) for the purpose of PDSCH reception and up to 8 in FR1, depending on UE capability. Each TCI state contains QCL information. A UE can be dynamically signaled one or two TCI states in the TCI field in a DCI scheduling a PDSCH.

Reliable data transmission with multiple panels or transmission points (TRP) has been proposed in 3GPP for Rel-16, in which a data packet may be transmitted over multiple TRPs to achieve diversity. Ultra-Reliable Low Latency (URLLC) data transmission may occur over multiple transmission points. An example is shown in FIG. 3, where the two PDSCHs carry the same encoded data payload but with the same or different redundancy versions so that the UE can do soft combining of the two PDSCHs to achieve more reliable reception. The two PDSCHs can be frequency division multiplexed (FDM) in a same slot, or time division multiplexed (TDM) in different slots or mini-slots within a slot.

Figure 4:
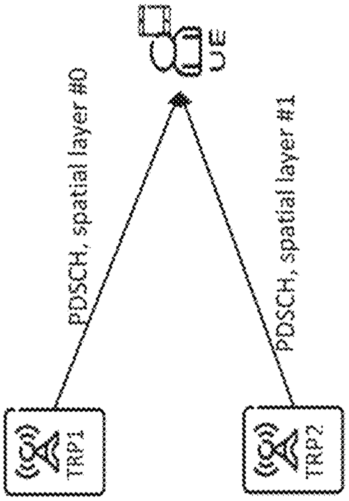
FIG. 4 is a block diagram illustrating an example of an SDM PDSCH transmission scheme according to some embodiments of inventive concepts.
Figure 5:
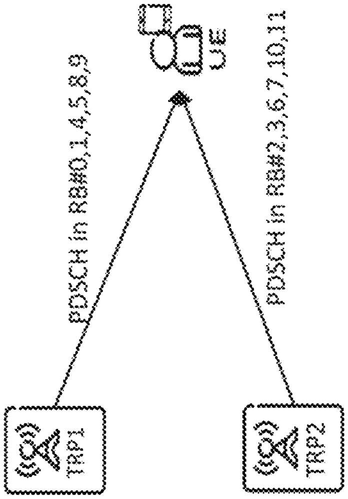
FIG. 5 is a block diagram illustrating an example of FDM PDSCH transmission scheme 2a according to some embodiments of inventive concepts.
Figure 6:
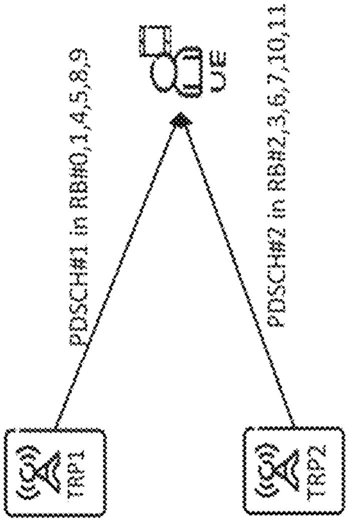
FIG. 6 is a block diagram illustrating an example of FDM PDSCH transmission scheme 2b according to some embodiments of inventive concepts.

Different schemes have been identified in 3GPP for PDSCH transmissions from multiple TRPs scheduled by a single DCI, including:

- Scheme 1a (SDM): n (n<=Ns) TCI states within the single slot, with overlapped time and frequency resource allocation
  - Each transmission occasion is a layer or a set of layers of the same TB, with each layer or layer set is associated with one TCI and one set of DMRS port(s).
  - Single codeword with one RV is used across all spatial layers or layer sets. From the UE perspective, different coded bits are mapped to different layers or layer sets with the same mapping rule as in Rel-15.
  - FIG. 4 shows an example of SDM scheme (Scheme 1a) with a single CW in which a PDSCH with two spatial layers, one from each TRP, is transmitted to a UE.
- Scheme 2 (FDM): n (n<=Nf) TCI states within the single slot, with non-overlapped frequency resource allocation
  - Each non-overlapped frequency resource allocation is associated with one TCI state.
  - Same single/multiple DMRS port(s) are associated with all non-overlapped frequency resource allocations.
  - Scheme 2a:
    - Single codeword with one RV is used across full resource allocation. From UE perspective, the common RB mapping (codeword to layer mapping as in Rel-15) is applied across full resource allocation.
    - FIG. 5 shows an example of PDM scheme with a single CW (Scheme 2a) in which a PDSCH is transmitted in RB#0,1,4,5,8,9 from TRP1 and RB#2,3,6,7,10,11 from TRP2.
  - Scheme 2b:
    - Single codeword with one RV is used for each non-overlapped frequency resource allocation. The RVs corresponding to each non-overlapped frequency resource allocation can be the same or different.
    - Additional UE capability is specified to inform the gNB whether the UE can support CW soft combining.
    - FIG. 6 shows an example of PDM scheme with 2 CWs (Scheme 2b) in which PDSCH#1 with CW#1 is transmitted in RB#0,1,4,5,8,9 from TRP1 and PDSCh#2 with CW#2 is transmitted in RB#2,3,6,7,10,11 from TRP2.
- Scheme 3 (TDM, mini-slot based): n (n<=Nt1) TCI states within the single slot, with non-overlapped time resource allocation
  - Each transmission occasion of the TB has one TCI and one RV with the time granularity of mini-slot.
  - All transmission occasion (s) within the slot use a common MCS with same single or multiple DMRS port(s).
  - RV/TCI state can be same or different among transmission occasions.
  - The maximal number of transmission layers per transmission occasion
    - up to two layers transmission Resource allocation at frequency domain:

Same frequency domain resource allocation across repetitions as Rel-15

Up to 2 TCI states across PDSCH repetitions

Figure 7:
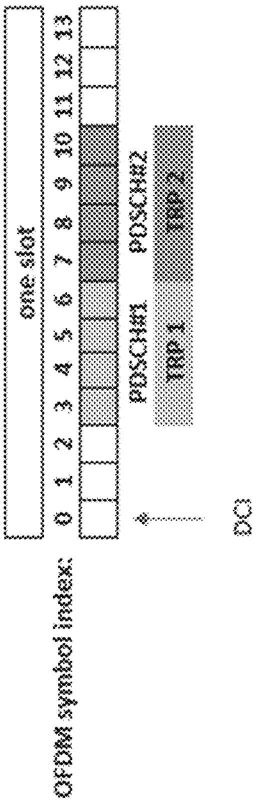
FIG. 7 is a block diagram illustrating an example of TDM PDSCH transmission scheme 3 according to some embodiments of inventive concepts.

FIG. 7 shows an example of Scheme 3 in which PDSCH repetition occurs in mini-slot of 4 OFDM symbols within a slot. Each PDSCH can be associated with a same or different RV.

Scheme 4 (TDM, slot based): n (n<=Nt2) TCI states with K (n<=K) different slots.

Each transmission occasion of the TB has one TCI and one RV.

All transmission occasion (s) across K slots use a common MCS with same single or multiple DMRS port(s)

RV/TCI state can be same or different among transmission occasions.

The maximal number of transmission layers per transmission occasion up to two layers transmission Resource allocation at frequency domain:

Same frequency domain resource allocation across repetitions as Rel-15

Figure 8:
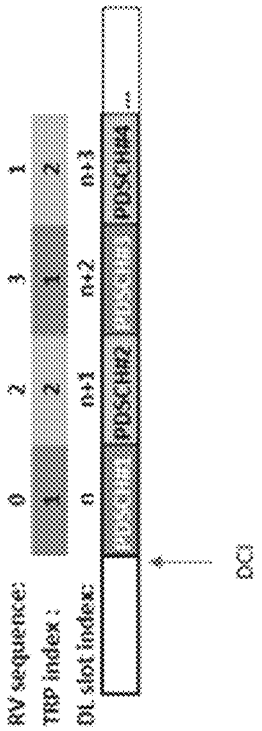
FIG. 8 is a block diagram illustrating an example of TDM PDSCH transmission scheme 4 according to some embodiments of inventive concepts.

Up to 2 TCI states across PDSCH repetitions, down-select one from following options:

An example for Scheme 4 is shown in FIG. 8, where 4 PDSCHs for a same TB are transmitted over 2 TRPs and in 4 consecutive slots. Each PDSCH is associated with a different RV.

Scheme 3 is similar to Scheme 4, but the repetition is done in mini-slot within a slot. These schemes are referred to as single DCI based multi-TRP (M-TRP) URLLC schemes. In RAN1#98bis, agreements were made on some signaling one or multiple of the schemes:

For scheme 3, the number of transmission occasions is implicitly determined by the number of TCI states indicated by a code point whereas one TCI state means one transmission occasion and two states means two transmission occasions. For scheme 4, TDRA indication is enhanced to additionally indicate the number of PDSCH transmission occasions by using PDSCH-TimeDomainResourceAllocation field. The maximum number of repetitions is for further study. For single-DCI based M-TRP URLLC scheme differentiation among schemes 2a/2b/3, from the UE perspective, a new RRC parameter is introduced to enable one scheme or multiple schemes among Schemes 2a/2b/3.

As shown above, for URLLC and multi-TRP operation, multiple transmission schemes have been defined, such as schemes 2a,2b and 3 for example. A gNB may need to dynamically switch between different transmission schemes since some traffic needs to be received with high reliability while others can be received with normal reliability but with higher spectral efficiency. However, a problem exists in determining how to dynamically switch the different schemes when scheduling the UE.

In accordance with embodiments described herein, to solve this problem, in the DCI that contains the scheduling assignment for the UE, a combination of multiple fields, the TDRA table, the antenna port indication table, and the TCI codepoint indication, is jointly used to implicitly indicate the transmission scheme used for the PDSCH transmission. In one example, a repetition field in TDRA is used for signaling both Scheme 3 and Scheme 4. More specifically, if the repetition field is present in the TDRA indicated in a DCI, the number of repetitions is one, and two TCI states are indicated in the DCI, Scheme 3 is selected. Otherwise, if the number of repetitions is greater than one and two TCI states are indicated in the DCI, Scheme 4 is selected.

In another example, if the repetition field is present in the TDRA indicated in a DCI, and one TCI states are indicated in the DCI, single TRP transmission scheme is used. If the number of repetitions, n, is greater than one, the PDSCH will be repeated in n consecutive slots. In another example, If the repetition field is not present and one TCI state is indicated in the DCI, Rel-15 single TRP transmission is used. If the repetition field is not present and two TCI states and DMRS ports in two CDM groups are indicated in the DCI, Scheme 1a is used. Otherwise, if two TCI states and DMRS port(s) in one CDM group is indicated in the DCI, either Scheme 2a or 2b is used.

The inventive concepts described herein enables dynamic indication of transmission schemes without introducing any new DCI field or RRC parameter, hence DCI payload is unchanged, which is an advantage. It also allows dynamic indication of number of repetitions in single TRP transmission. The inventive concepts described herein also supports indicating a hybrid scheme of Scheme 1a and Scheme 4, which has the benefit of increased diversity with multiple layers per repetition.

Figure 9:
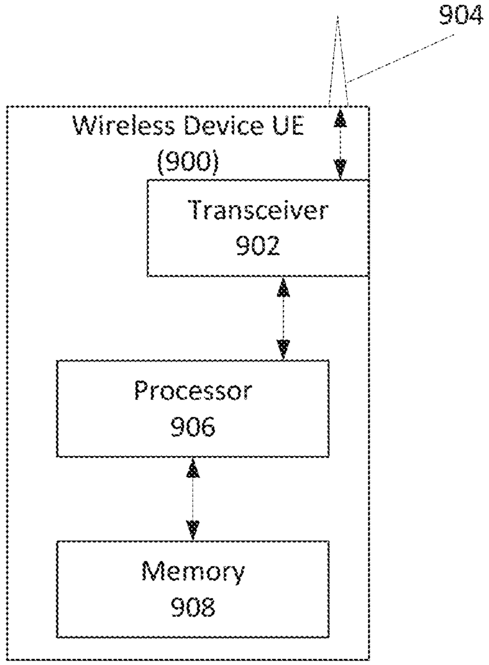
FIG. 9 is a block diagram illustrating a wireless device UE according to some embodiments of inventive concepts.

Operations of the wireless device 900 (implemented using the structure of the block diagram of FIG. 9) will now be discussed with reference to the flow chart of FIG. 11 according to some embodiments of inventive concepts. For example, modules may be stored in memory 908 of FIG. 9, and these modules may provide instructions so that when the instructions of a module are executed by respective wireless device processing circuitry 906, processing circuitry 906 performs respective operations of the flow chart.

Figure 11:
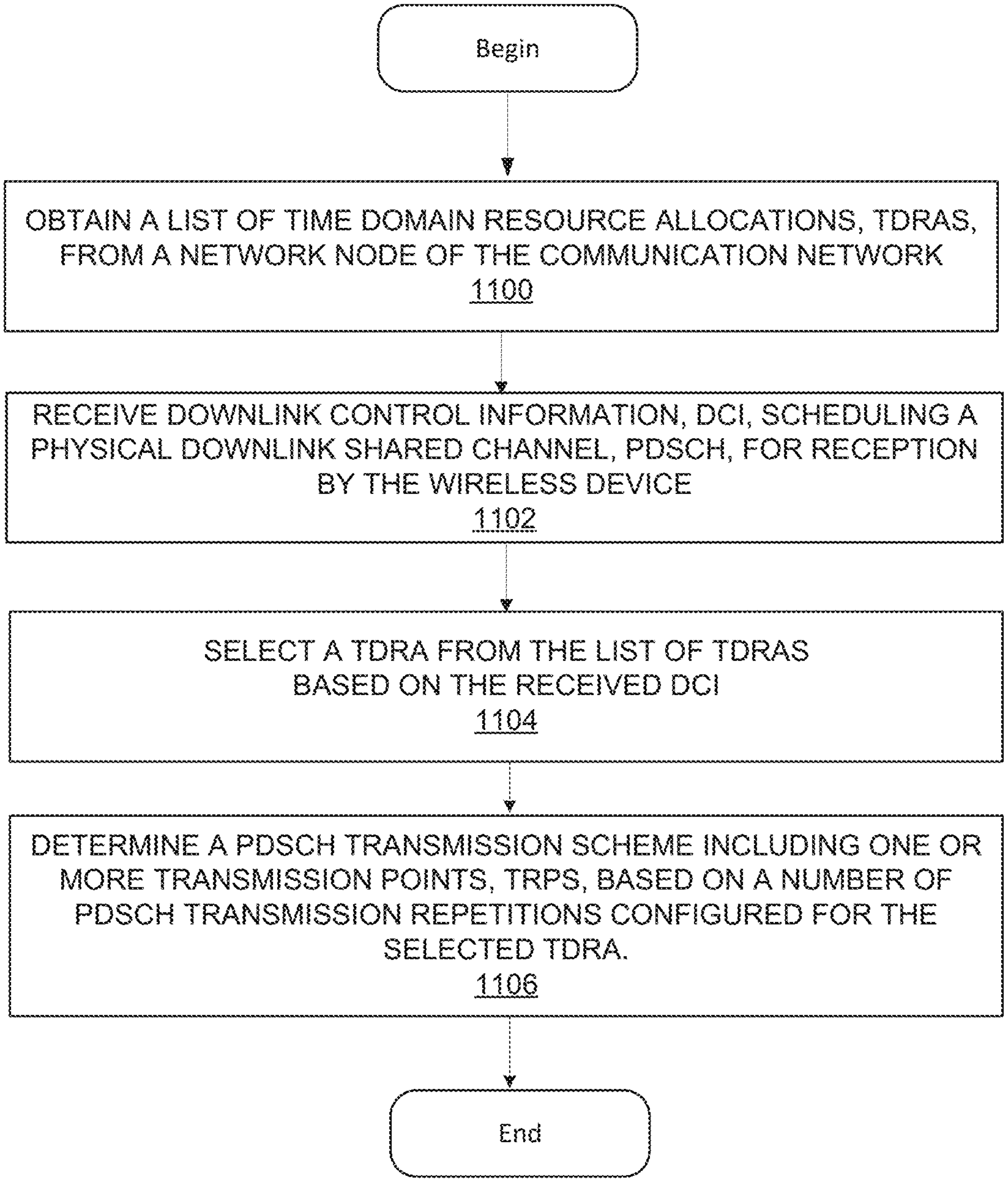
FIG. 11 is a flow chart illustrating operations of a wireless device according to some embodiments of inventive concepts.

FIG. 11 illustrates a method of operating a wireless device in a communication network in accordance with embodiments of the inventive concepts. FIG. 11 illustrates the method includes receiving 1100 a list of time domain resource allocations, TDRAs, from a network node of the communication network. For example, wireless device 900 may receive a list of TDRAs from a network node, such as, but not limited to, RAN node 1000 illustrated in FIG. 10. FIG. 11 also illustrates the method includes receiving 1102 downlink control information, DCI, scheduling a physical downlink shared channel, PDSCH, for reception by the wireless device. Continuing the previous example, wireless device 900 may receive downlink control information, DCI, scheduling a physical downlink shared channel, PDSCH, for reception by wireless device 900. The DCI may be received from the network node, such as RAN node 1100.

FIG. 11 also illustrates the method includes selecting 1104 a TDRA from the list of TDRAs based on the received DCI. Continuing the previous example, wireless device 900 may select a TDRA from the list of TDRAs based on the received DCI. Additional embodiments regarding the selection of the TDRA from the list of TDRAs by wireless device 900 are described in further detail below. FIG. 11 further illustrates the method includes determining 1106 a PDSCH transmission scheme including one or more transmission points, TRPs, based on a number of PDSCH transmission repetitions configured for the selected TDRA. Continuing the previous example, wireless device 900 may determine a PDSCH transmission scheme including one or more TRPs based on a number of PDSCH transmission repetitions configured for the selected TDRA. Additional embodiments regarding the determination of the PDSCH transmissions are described in further detail below.

In some embodiments, the UE is configured from network with a new TDRA where at least one entry in the TDRA table indicates a number of repetitions. Secondly, the UE is scheduled downlink data and the PDCCH DCI indicates the scheduling resource including an entry from the TDRA table. In accordance with embodiments, the received DCI indicates a number of transmission configuration indicator, TCI, states. In some embodiments, selecting the TDRA from the list of TDRAs comprises selecting the TDRA from the list of TDRAs based on the number of TCI states indicated in the received DCI. In some embodiments, selecting the TDRA from the list of TDRAs comprises selecting the TDRA from the list of TDRAs based on a time domain resource assignment bit field in the received DCI. Additional examples and implementations of the time domain resource assignment bit field are described herein above. The received DCI may also indicate a number of code multiplexed, CDM, groups associated with one or more demodulation reference signal, DMRS, ports. In accordance with some other embodiments, the method may include selecting the TDRA from the list of TDRAs based on the number of CDM groups associated with the one or more DRMS ports.

For example, if the number of PDSCH repetitions in the indicated TDRA indicated in a DCI scheduling a PDSCH is one and DCI indicates two TCI states and DCI indicates the DMRS ports limited within one CDM group only, (these are indicated in the same DCI), then this combination indicates to the UE that Scheme 3 is selected, i.e. the scheduled PDSCH will be transmitted according to Scheme 3 with two PDSCH transmissions within the same slot.

Alternatively, if the number of PDSCH repetitions in the indicated TDRA indicated in a DCI scheduling a PDSCH is larger than one and DCI indicates two TCI states and DCI indicates the DMRS ports limited within one CDM group only, (these are indicated in the same DCI), then this combination indicates to the UE that Scheme 4 is selected, i.e. the scheduled PDSCH will be transmitted according to Scheme 4 with the number of PDSCH transmission occasions across slots as indicated by the TDRA.

In accordance with embodiments, each TDRA of the list of TDRAs is associated with information indicating a number of PDSCH transmission repetitions configured for the TDRA. An example is shown Table 3, where the table captures the TDRAs configured by an RRC parameter PDSCH-TimeDomainResourceAllocationList. Each entry in the "Number of PDSCH Repetitions (n)" column corresponds an information field in each TDRA configured by PDSCH-TimeDomainResourceAllocationList.

TABLE 3

An example of extended PDSCH time domain resource allocation table with number of PDSCH repetitions.

| Row index | PDSCH mapping type | $K_0$ | Start Symbol And Length (SLIV) | Number of PDSCH Repetitions (n) |
|---|---|---|---|---|
| 1 | Type A | 0 | SLIV1 | (not configured) |
| 2 | Type A | 0 | SLIV2 | (not configured) |
| 3 | Type A | 0 | SLIV3 | n = 1 |
| 4 | Type A | 0 | SLIV4 | n = 2 |
| 5 | Type A | 0 | SLIV5 | n = 4 |
| 6 | Type A | 0 | SLIV6 | (not configured) |
| 7 | Type B | 1 | SLIV7 | (not configured) |
| 8 | Type B | 1 | SLIV8 | (not configured) |
| | | | . . . | |
| N | Type B | 1 | SLIV16 | (not configured) |

In accordance with embodiments, the method may include determining the PDSCH transmission scheme by selecting a PDSCH transmission scheme from multiple different PDSCH transmission schemes used for PDSCH transmission from multiple TRPs scheduled by a single DCI. For example, wireless device 900 may select a PDSCH transmission scheme from the multiple different PDSCH transmission schemes described herein from the one or multiple TRPs in Table 3 shown above using a single DCI. According to some embodiments, the multiple different PDSCH transmission schemes comprises one or more of the following PDSCH transmission schemes used for PDSCH transmission from multiple TRPs: PDSCH transmission scheme 1a, PDSCH transmission scheme 2, PDSCH transmission scheme 3, and PDSCH transmission scheme 4 as described herein. The multiple different PDSCH transmission schemes may also comprises a hybrid PDSCH transmission scheme in which the PDSCH transmission scheme 1a is repeated in one of two or four slots in accordance with embodiments.

The method may also include determining the PDSCH transmission scheme by selecting PDSCH transmission scheme 3 based on the number of PDSCH transmission repetitions being equal to one and the DCI indicating two TCI states and one CDM group according to some embodiments. For example, when row 3 in Table 3 is indicated in the TDRA field in a DCI and two TCI states and DMRS ports in one CDM group are indicated in the same DCI, Scheme 3 is used for the PDSCH. The method may also include determining the PDSCH transmission scheme by selecting PDSCH transmission scheme 4 based on the number of PDSCH transmission repetitions being greater than one and the DCI indicating two TCI states and one CDM group according to some other embodiments. In another example, if row 4 or row 5 of Table 3 is indicated and two TCI states and DMRS ports in one CDM group are indicated in the same DCI, then Scheme 4 is used with repetition 2 or 4, respectively. In another example, if row 1,2 or 6 to row N in Table 3 is indicated, then neither Scheme 3 or 4 is used for the transmission.

The method may include determining the PDSCH transmission scheme by selecting a single TRP PDSCH transmission scheme based on the number of PDSCH transmission repetitions for the selected TDRA equals to one and the DCI indicates one TCI state according to some embodiments. For example, if row 3 in Table 3 is indicated in the TDRA field in a DCI but one TCI state is indicated in the same DCI instead of two TCI states, then Rel-15 single TRP PDSCH transmission is used. In some other embodiments, the method may include determining the PDSCH transmission scheme by selecting a single TRP PDSCH transmission scheme based on the number of PDSCH transmission repetitions for the selected TDRA is greater than one and the DCI indicates one TCI state. For example, if row 4 or row 5 in Table 3 is indicated but only one TCI state is indicated in the same DCI, PDSCH repetition over a single TRP is used with 2 or 4 repetitions, respectively.

In some other embodiments, the method may include determining the PDSCH transmission scheme by selecting the hybrid PDSCH transmission scheme based on the number of PDSCH transmission repetitions is greater than one and the DCI indicating two TCI states and two CDM groups. For example, if row 4 or row 5 in Table 3 is indicated with two TCI states but DMRS ports in two CDM groups in a DCI, a hybrid scheme of Scheme 1a and Scheme 4 is used in which Scheme 1a is repeated in 2 or 4 slots, respectively.

Figure 12:
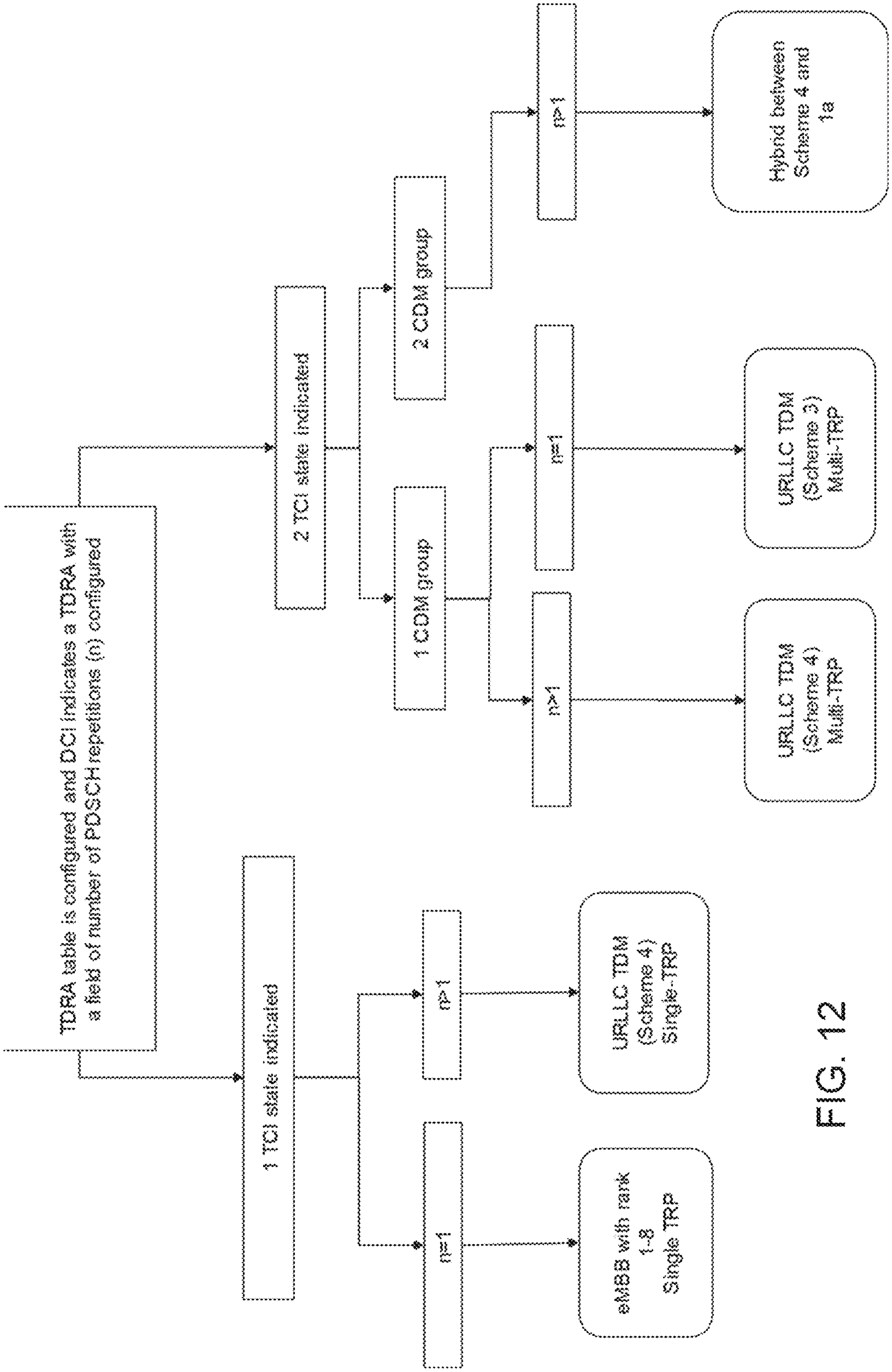
FIG. 12 is an example flow chart illustrating selecting a PDSCH scheme according to some embodiments of inventive concepts.

The above embodiments and examples are summarized by the flowchart in FIG. 12, which illustrates the selection process of various PDSCH schemes when the number of PDSCH repetition field is present in the TDRA. Further, scheme 3 may be disabled (or not enabled) by the network to the UE, in case 2 TCI states are indicated and 1 CDM group is indicated and one repetition in the TDRA, then the UE shall ignore this scheduling assignment since this would then correspond to an invalid scheduling assignment. Hence, scheme 3 may be additionally enabled by RRC configuration in the dynamic switching algorithm described here. This indication allows for dynamic switching between transmission schemes based on the traffic type and availability of the scheduling resources in one or multiple TRPs.

Furthermore, if the Number of PDSCH Repetitions field is not present in a row, i.e. "not configured" in the "Number of PDSCH Repetitions" column in Table 3 shown above, some more embodiments are elaborated in the following.

In one embodiment, if one TCI state is indicated in a DCI, Rel-15 single TRP scheme is used. In some other embodiments, the method may include determining the PDSCH transmission scheme by selecting scheme 1a based on the information indicating that no PDSCH transmission repetitions are configured for the selected TDRA and the DCI indicating two TCI states and two CDM groups. For example, if two TCI states and DMRS ports in two CDM groups are indicated, Scheme 1a is used.

In some other embodiments, the method may include determining the PDSCH transmission scheme by selecting one of scheme 2a or 2b based on the information indicating that no PDSCH transmission repetitions are configured for the selected TDRA and the DCI indicating two TCI states and one CDM group. For example, if two TCI states and DMRS port(s) in one CDM group is indicated, either Scheme 2a or Scheme 2b is used. In this embodiment, schemes 2a and/or 2b are enabled by RRC. Scheme 2a or 2b may be indicated separately either by enabling using RRC configuration directly or by additional implicit selection by DCI. For example, if both Scheme 2a/2b are enabled by RRC, then which of Scheme 2a/2b is used for the scheduled PDSCH may be distinguished by the CDM group of the DMRS ports indicated by the same DCI.

The method may include determining the PDSCH transmission scheme by selecting scheme 3 based on the information indicating that no PDSCH transmission repetitions are configured for the selected TDRA and the DCI indicating two TCI states and one CDM group according to some other embodiments. For example, if the "Number of PDSCH Repetitions" field is not present in a row in Table 3 and two TCI states and DMRS port(s) in one CDM group is indicated, one of Scheme 2a, Scheme 2b, and Scheme 3 is used, provided that the scheme is first enabled by RRC signaling. Schemes 2a/2b/3 may be indicated separately either by RRC configuration or implicitly by DCI. In another embodiment, between Scheme 3 and Scheme 2a/2b, it is signaled by RRC while between Schemes 2a and 2b, it is dynamically indicated by DCI.

Figure 13:
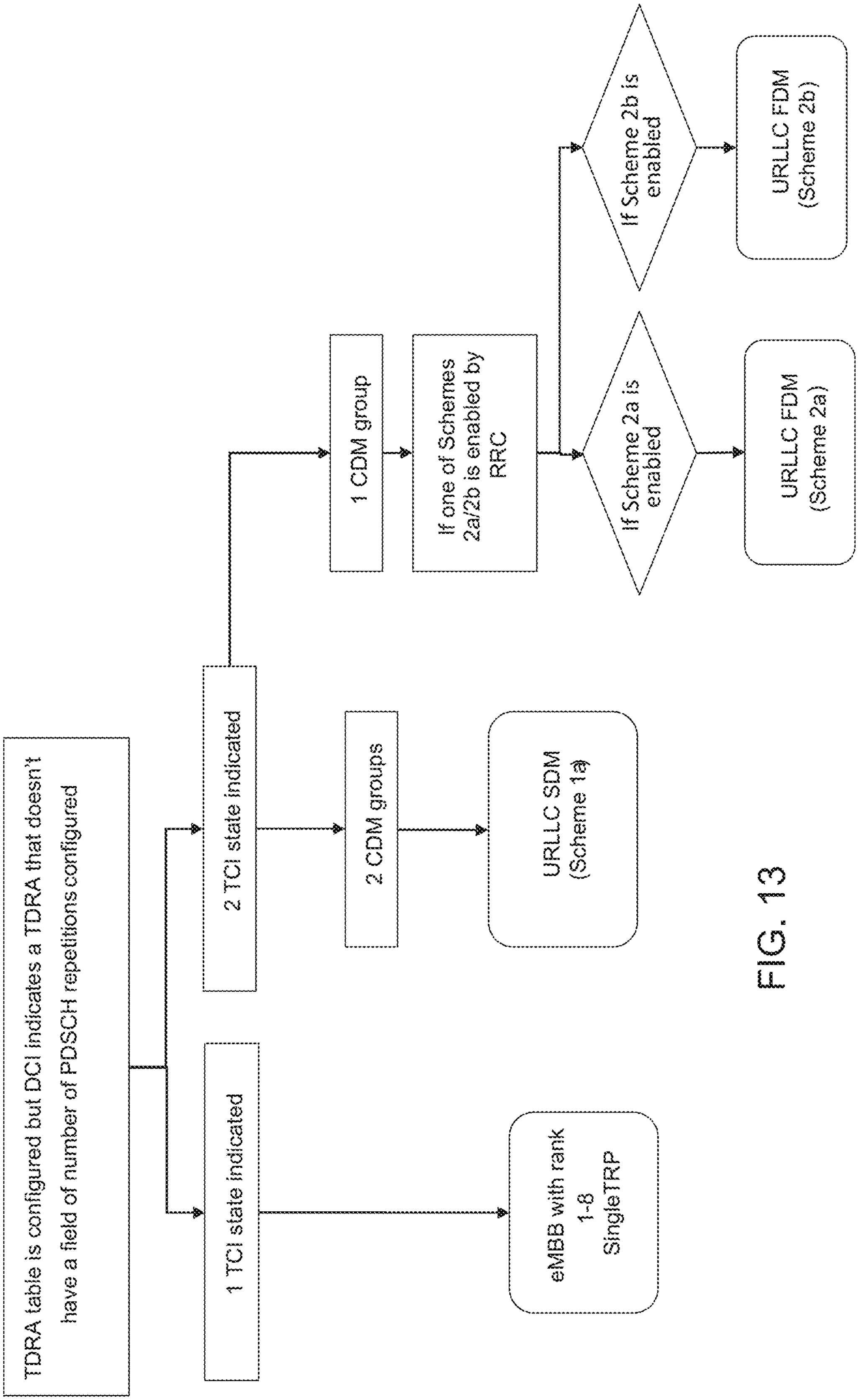
FIG. 13 is an example flow chart illustrating selecting a PDSCH scheme when a repetition field is not present in a TDRA according to some embodiments of inventive concepts.
Figure 14:
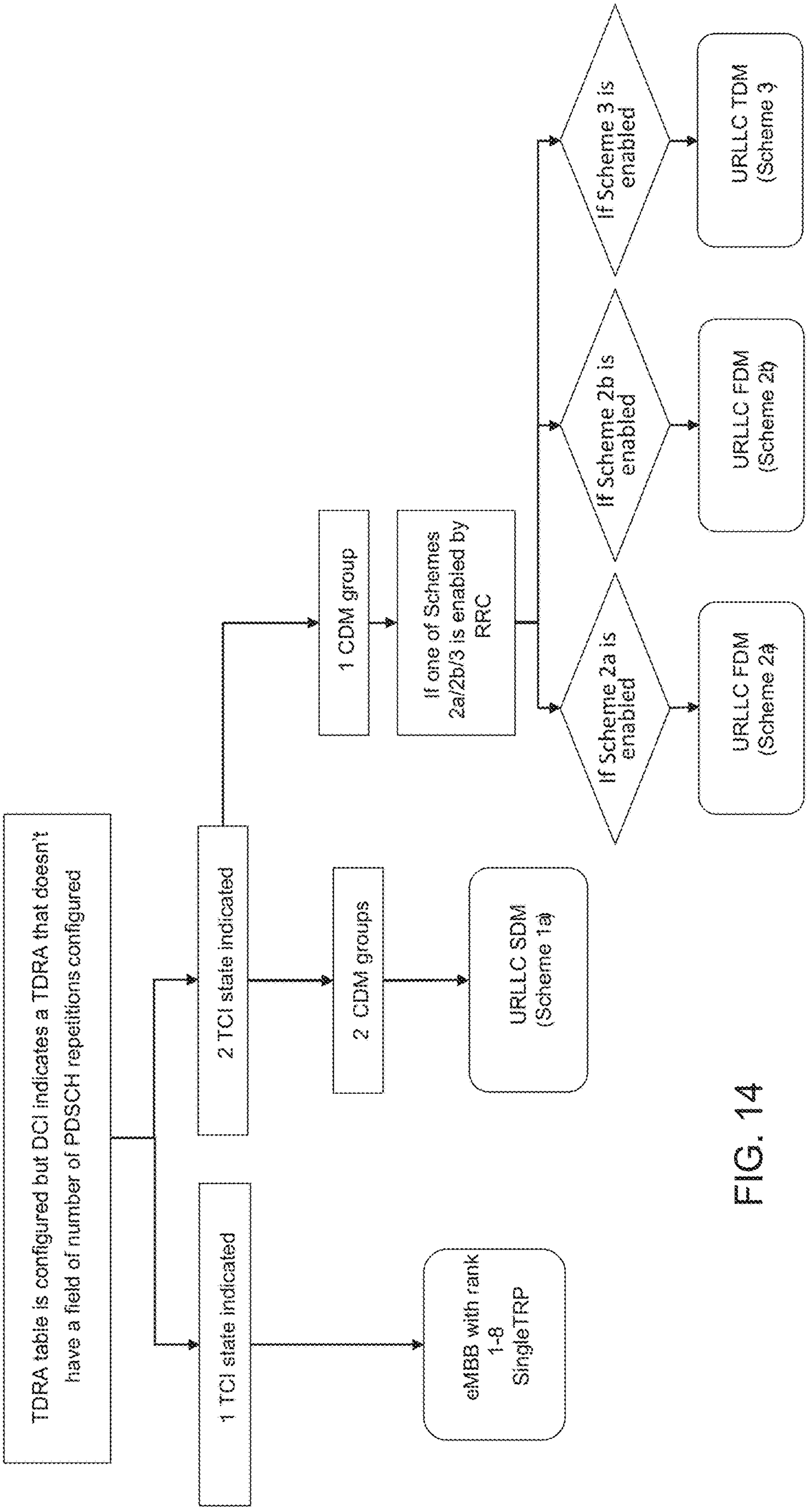
FIG. 14 is an example flow chart illustrating selecting PDSCH schemes 2a, 2b, or 3 enabled by RRC according to some embodiments of inventive concepts.
Figure 15:
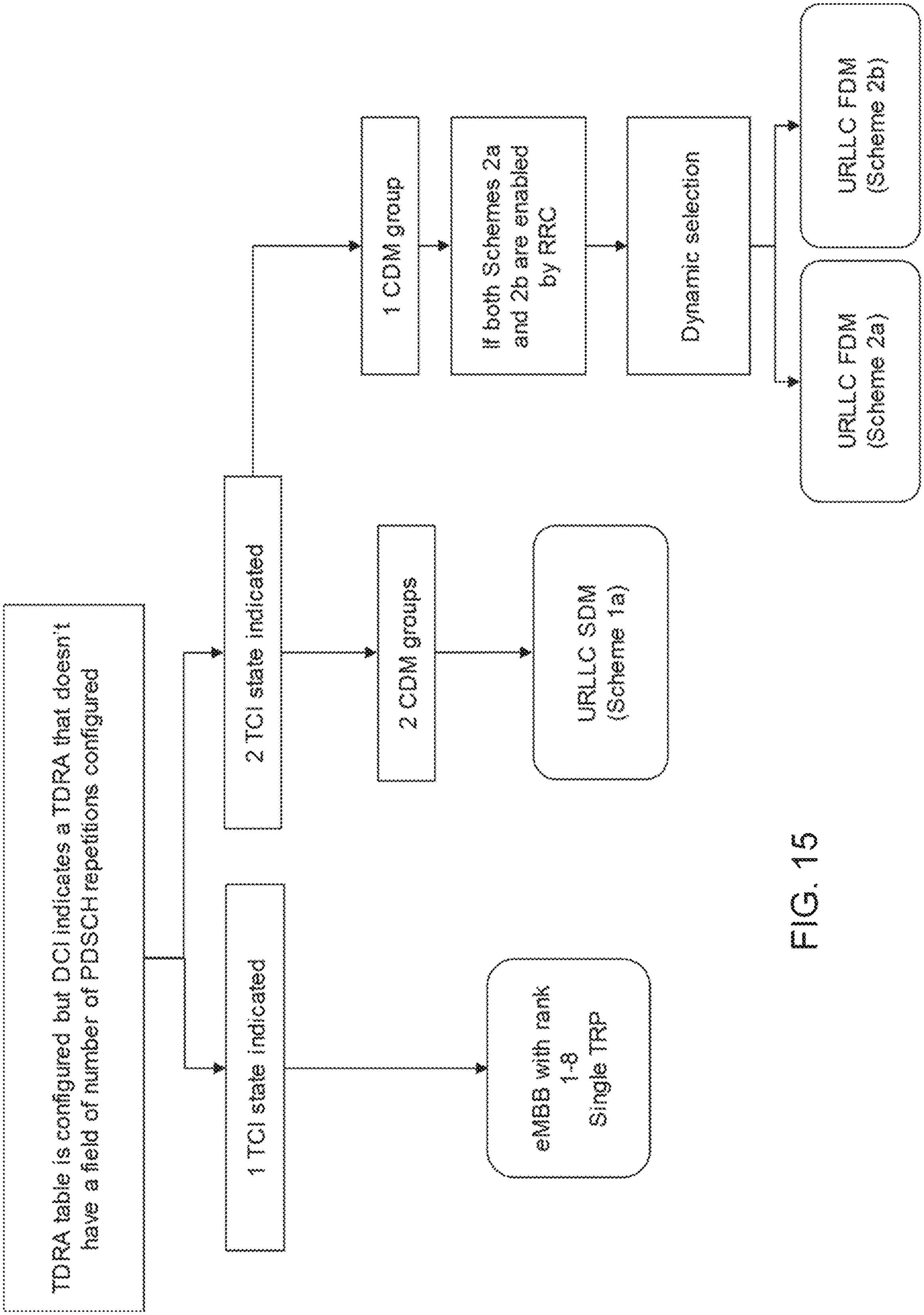
FIG. 15 is an example flow chart illustrating selecting PDSCH schemes 2a or 2b enabled by RRC according to some embodiments of inventive concepts.

According to some embodiments, as discussed above, the method may include determining the PDSCH transmission scheme comprises determining the PDSCH transmission scheme is enabled by radio resource control, RRC. The above examples are summarized in FIGS. 13 to 15 for the case of RRC enables one of Schemes 2a and 2b, one of Schemes 2a/2b/3, and both Schemes 2a and 2b, respectively. FIG. 13 illustrates an example indication of various schemes when the number of PDSCH repetition field is not present in TDRA, and either Scheme 2a or 2b is enabled by RRC. FIG. 14 illustrates an example indication of various schemes when the number of PDSCH repetition field is not present in TDRA, and either Scheme 2a, 2b, or 3 is enabled by RRC. FIG. 15 illustrates an example indication of various schemes when the number of PDSCH repetition field in not present in TDRA, and both Scheme 2a and 2b are enabled by RRC.

Operations of a RAN node 1000 (implemented using the structure of FIG. 10) will now be discussed with reference to the flow chart of FIG. 16 according to some embodiments of inventive concepts. For example, modules may be stored in memory 1008 of FIG. 10, and these modules may provide instructions so that when the instructions of a module are executed by respective RAN node processing circuitry 1006, processing circuitry 1006 performs respective operations of the flow chart.

Figure 16:
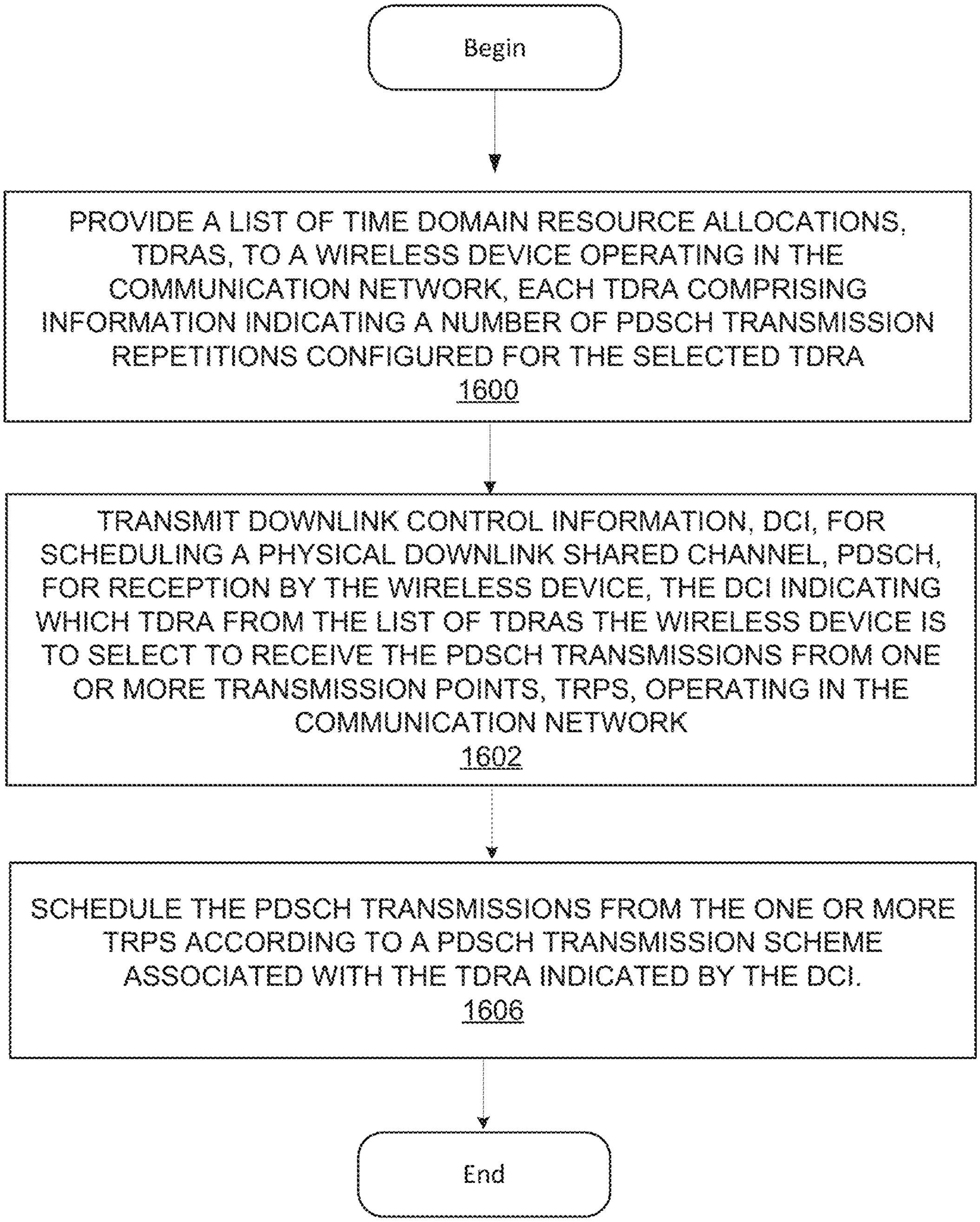
FIG. 16 is a flow chart illustrating operations of a radio access network node according to some embodiments of inventive concepts.

FIG. 16 illustrates a method of operating a radio access network node, RAN, in a communication network in accordance with embodiments of the inventive concepts described herein. FIG. 16 illustrates the method includes transmitting 1600 a list of time domain resource allocations, TDRAs, to a wireless device operating in the communication network, each TDRA comprising information indicating a number of PDSCH transmission repetitions configured for the selected TDRA. For example, RAN 1000 may transmit a list of TDRAs to wireless device 900 operating in the communication network, each TDRA comprising information indicating the number of PDSCH transmission repetitions configured for the selected TDRA. FIG. 16 also illustrates the method includes scheduling 1606 the PDSCH transmissions from the one or more TRPs according to a PDSCH transmission scheme associated with the TDRA indicated by the DCI. Continuing the previous example, RAN 1000 may schedule the PDSCH transmissions from the one or more TRPs according to a PDSCH transmission scheme associated with the TDRA indicated by the DCI.

According to some embodiments, the method of operating the RAN may include scheduling the PDSCH transmissions from the one or more TRPs according to the PDSCH transmission scheme by selecting a PDSCH transmission scheme from multiple different PDSCH transmission schemes used for PDSCH transmission from the one or more TRPs scheduled by a single DCI. For example, RAN 1000 may select one of the PDSCH transmission schemes described above according to the one or more TRPs listed in Table 3 above transmitted to wireless device 900.

Example embodiments are discussed below.

Embodiment 1: A method of operating a wireless device in a communication network, the method comprising:

receiving a list of time domain resource allocations, TDRAs, from a network node of the communication network;

receiving downlink control information, DCI, scheduling a physical downlink shared channel, PDSCH, for reception by the wireless device;

selecting a TDRA from the list of TDRAs based on the received DCI; and determining a PDSCH transmission scheme including one or more transmission points, TRPs, based on a number of PDSCH transmission repetitions configured for the selected TDRA.

Embodiment 2: The method according to embodiment 1, wherein each TDRA of the list of TDRAs is associated with information indicating a number of PDSCH transmission repetitions configured for the TDRA.

Embodiment 3: The method according to any of embodiments 1-2, wherein the received DCI indicates a number of transmission configuration indicator, TCI, states; and wherein selecting the TDRA from the list of TDRAs comprises selecting the TDRA from the list of TDRAs based on the number of TCI states indicated in the received DCI.

Embodiment 4: The method according to any of embodiments 1-3, wherein the received DCI indicates a number of code domain multiplexed, CDM, groups associated with one or more demodulation reference signal, DMRS, ports; and wherein selecting the TDRA from the list of TDRAs comprises selecting the TDRA from the list of TDRAs based on the number of CDM groups associated with the one or more DMRS ports.

Embodiment 5: The method according to any of embodiments 1-4, wherein determining the PDSCH transmission scheme comprises determining that the PDSCH transmission scheme is enabled by radio resource control, RRC.

Embodiment 6: The method according to any of embodiments 1-5, wherein determining the PDSCH transmission scheme comprises selecting a PDSCH transmission scheme from multiple different PDSCH transmission schemes used for PDSCH transmission from multiple TRPs scheduled by a single DCI.

Embodiment 7: The method according to any of embodiments 1-6, wherein the multiple different PDSCH transmission schemes comprise one or more of the following PDSCH transmission schemes as defined by the Third Generation Partnership Project, 3GPP, used for PDSCH transmission from multiple TRPs: PDSCH transmission scheme 1a, PDSCH transmission scheme 2, PDSCH transmission scheme 3, PDSCH transmission scheme 4.

Embodiment 8: The method according to any one of embodiments 1-7, wherein one of the multiple different PDSCH transmission schemes comprises a hybrid PDSCH transmission scheme in which PDSCH transmission scheme 1a is repeated in one of two or four slots.

Embodiment 9: The method according to any one of embodiments 1-8, wherein determining the PDSCH transmission scheme comprises selecting PDSCH transmission scheme 3 based on the number of PDSCH transmission repetitions being equal to one and the DCI indicating two TCI states and one CDM group.

Embodiment 10: The method according to any one of embodiments 1-8, wherein determining the PDSCH transmission scheme comprises selecting PDSCH transmission scheme 4 based on the number of PDSCH transmission repetitions being greater than one and the DCI indicating two TCI states and one CDM group.

Embodiment 11: The method according to any one of embodiments 1-8, wherein determining the PDSCH transmission scheme comprises selecting the hybrid PDSCH transmission scheme based on the number of PDSCH transmission repetitions is greater than one and the DCI indicating two TCI states and two CDM groups.

Embodiment 12: The method according to any one of embodiments 1-8, wherein determining the PDSCH transmission scheme comprises selecting scheme 1a based on the information indicating that no PDSCH transmission repetitions are configured for the selected TDRA and the DCI indicating two TCI states and two CDM groups.

Embodiment 13: The method according to any one of embodiments 1-8, wherein determining the PDSCH transmission scheme comprises selecting one of scheme 2a or 2b based on the information indicating that no PDSCH transmission repetitions are configured for the selected TDRA and the DCI indicating two TCI states and one CDM group.

Embodiment 14: The method according to any one of embodiments 1-8 and 13, wherein schemes 2a or 2b are enabled by RRC.

Embodiment 15: The method according to any one of embodiments 1-8, wherein determining the PDSCH transmission scheme comprises selecting scheme 3 based on the information indicating that no PDSCH transmission repetitions are configured for the selected TDRA and the DCI indicating two TCI states and one CDM group.

Embodiment 16: The method according to any one of embodiments 1-8 and 15, wherein scheme 3 is enabled by RRC.

Embodiment 17: The method according to embodiment 1, wherein determining the PDSCH transmission scheme comprises selecting a single TRP PDSCH transmission scheme based on the number of PDSCH transmission repetitions for the selected TDRA equals to one and the DCI indicates one TCI state.

Embodiment 18: The method according to embodiment 1, wherein determining the PDSCH transmission scheme comprises selecting a single TRP PDSCH transmission scheme based on the number of PDSCH transmission repetitions for the selected TDRA is greater than one and the DCI indicates one TCI state.

Embodiment 19. A wireless device (300) comprising:

processing circuitry (303); and memory (305) coupled with the processing circuitry, wherein the memory includes instructions that when executed by the processing circuitry causes the wireless device to perform operations according to any of Embodiments 1-18.

Embodiment 20. A wireless device (300) adapted to perform according to any of Embodiments 1-18.

Embodiment 21. A computer program comprising program code to be executed by processing circuitry (303) of a wireless device (300), whereby execution of the program code causes the wireless device (300) to perform operations according to any of embodiments 1-18.

Embodiment 22. A computer program product comprising a non-transitory storage medium including program code to be executed by processing circuitry (303) of a wireless device (300), whereby execution of the program code causes the wireless device (300) to perform operations according to any of embodiments 1-18.

Embodiment 23. A method of operating a radio access network node, RAN, in a communication network, the method comprising:

transmitting a list of time domain resource allocations, TDRAs, to a wireless device operating in the communication network, each TDRA comprising information indicating a number of PDSCH transmission repetitions configured for the selected TDRA;

transmitting downlink control information, DCI, for scheduling a physical downlink shared channel, PDSCH, for reception by the wireless device, the DCI indicating which TDRA from the list of TDRAs the wireless device is to select to receive the PDSCH transmissions from one or more transmission points, TRPs, operating in the communication network; and scheduling the PDSCH transmissions from the one or more TRPs according to a PDSCH transmission scheme associated with the TDRA indicated by the DCI.

Embodiment 24: The method according to embodiment 23, wherein each TDRA of the list of TDRAs is associated with information indicating a number of PDSCH transmission repetitions configured for the TDRA.

Embodiment 25: The method according to any of embodiments 23-24, wherein the DCI indicates a number of transmission configuration indicator, TCI, states used by the wireless device to select the TDRA from the list of TDRAs based on the number of TCI states indicated in the received DCI.

Embodiment 26: The method according to any of embodiments 23-25, wherein the DCI indicates a number of code domain multiplexed, CDM, groups associated with one or more demodulation reference signal, DMRS, ports used by the wireless device to select the TDRA from the list of based on the number of CDM groups associated with the one or more DMRS ports.

Embodiment 27: The method according to any of embodiments 23-26, further comprising enabling the PDSCH transmission scheme by radio resource control, RRC.

Embodiment 28: The method according to any of embodiments 23-28, wherein scheduling the PDSCH transmissions from the one or more TRPs according to the PDSCH transmission scheme comprises selecting a PDSCH transmission scheme from multiple different PDSCH transmission schemes used for PDSCH transmission from the one or more TRPs scheduled by a single DCI.

Embodiment 29: The method according to any of embodiments 23-28, wherein the multiple different PDSCH transmission schemes comprise one or more of the following PDSCH transmission schemes as defined by the Third Generation Partnership Project, 3GPP, used for PDSCH transmission from multiple TRPs: PDSCH transmission scheme 1a, PDSCH transmission scheme 2, PDSCH transmission scheme 3, PDSCH transmission scheme 4.

Embodiment 30: The method according to any one of embodiments 23-29, wherein one of the multiple different PDSCH transmission schemes comprises a hybrid PDSCH transmission scheme in which PDSCH transmission scheme 1a is repeated in one of two or four slots.

Embodiment 31: A radio access network, RAN, node (400) comprising:

processing circuitry (403); and memory (405) coupled with the processing circuitry, wherein the memory includes instructions that when executed by the processing circuitry causes the RAN node to perform operations according to any of Embodiments 23-30.

Embodiment 32: A radio access network, RAN, node (400) adapted to perform according to any of Embodiments 23-30.

Embodiment 33: A computer program comprising program code to be executed by processing circuitry (403) of a radio access network, RAN, node (400), whereby execution of the program code causes the RAN node (400) to perform operations according to any of embodiments 23-30.

Embodiment 34: A computer program product comprising a non-transitory storage medium including program code to be executed by processing circuitry (403) of a radio access network, RAN, node (400), whereby execution of the program code causes the RAN node (400) to perform operations according to any of embodiments 23-30.

Explanations are provided below for various abbreviations/acronyms used in the present disclosure.

| Abbreviation | Explanation |
|---|---|
| CP-OFDM | Cyclic Prefix Orthogonal Frequency Division Multiplexing |
| DFT-S-OFDM | Discrete Fourier Transform (DFT) spread Orthogonal Frequency Division |
| PDCH | Physical Data Channel |
| SCS | Supported Carrier Spacing |
| RB | Resource Block |
| RE | Resource Element |
| DCI | Downlink Control Information |
| TDRA | Time Domain Resource Allocation |
| SLIV | Start and Length Indicator |
| CDM | Code Domain Multiplexed |
| QCL | Quasi Co-located |
| CSI-RS | Channel State Information Reference Signals |
| TCI | Transmission Configuration Identifier |
| FR1 | Frequency Range 1 for 5G-NR |
| URLLC | Ultra-Reliable low latency |
| TRP | Transmission Point |
| RV | Redundancy Version |
| FDM | Frequency Domain Multiplexed |
| TB | Transport Block |
| MCS | Modulation Coding Scheme |

Additional Explanation is Provided Below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
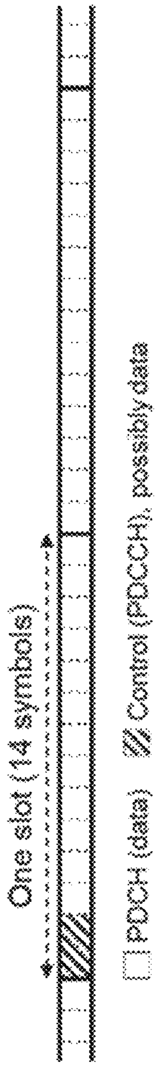
PRIOR ART FIG. 1
FIG. 1 is a block diagram illustrating an NR time-domain structure with 15 kHz subcarrier spacing.
Figure 2:
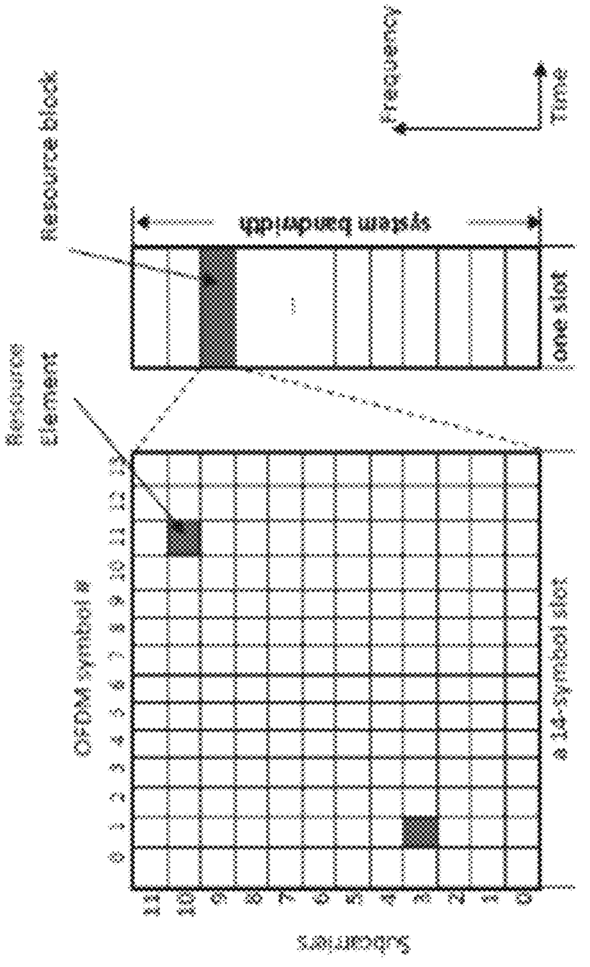
FIG. 2 PRIOR ART
FIG. 2 is a block diagram illustrating an NR physical resource grid.
Figure 17:
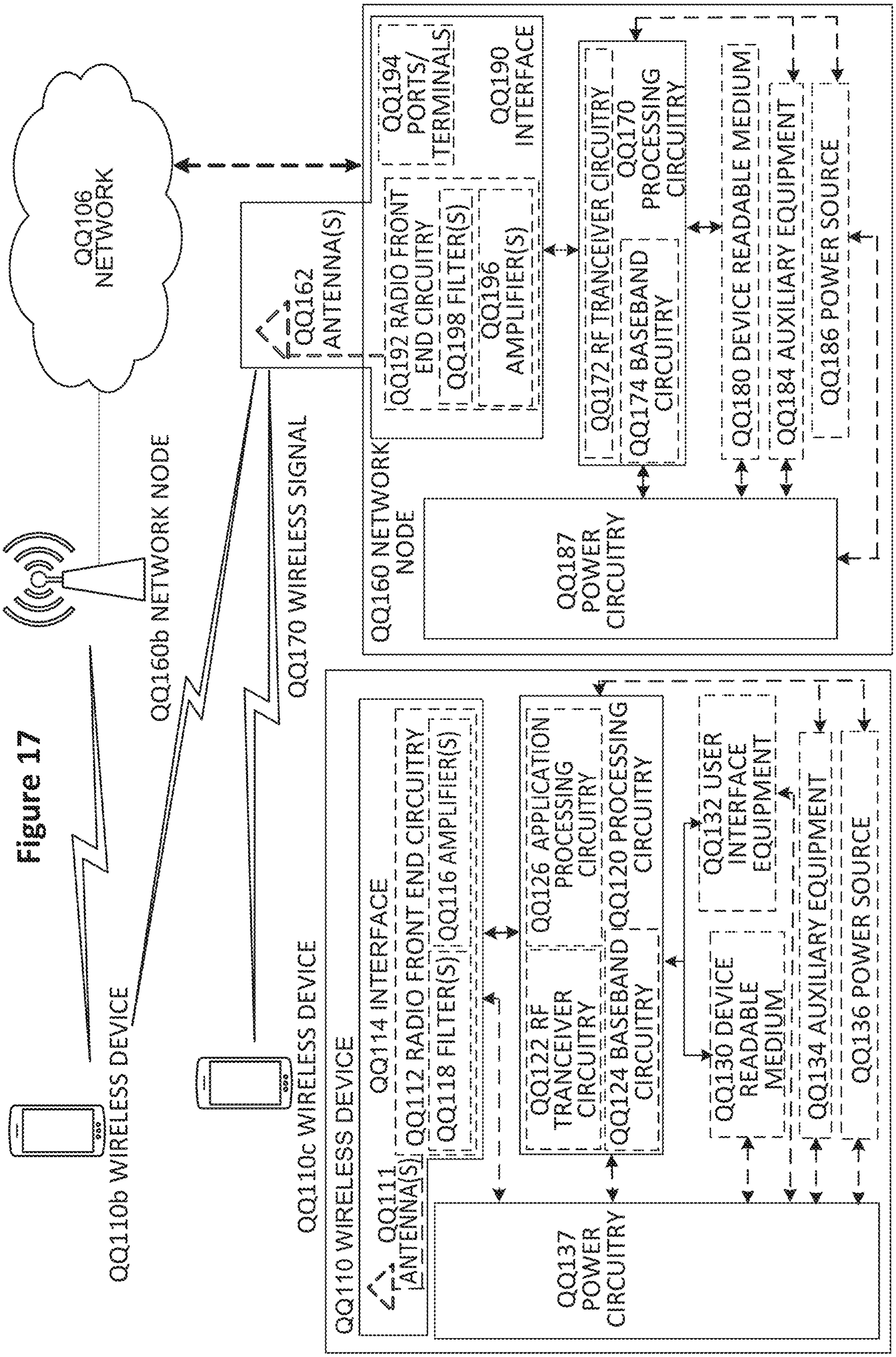
FIG. 17 is a block diagram of a wireless network in accordance with some embodiments.

FIG. 17 1 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 17. For simplicity, the wireless network of FIG. 17 only depicts network QQ106, network nodes QQ160 and QQ160*b*, and WDs QQ110, QQ110*b*, and QQ110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 17, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 17 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signaling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 17 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc.

The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 18:
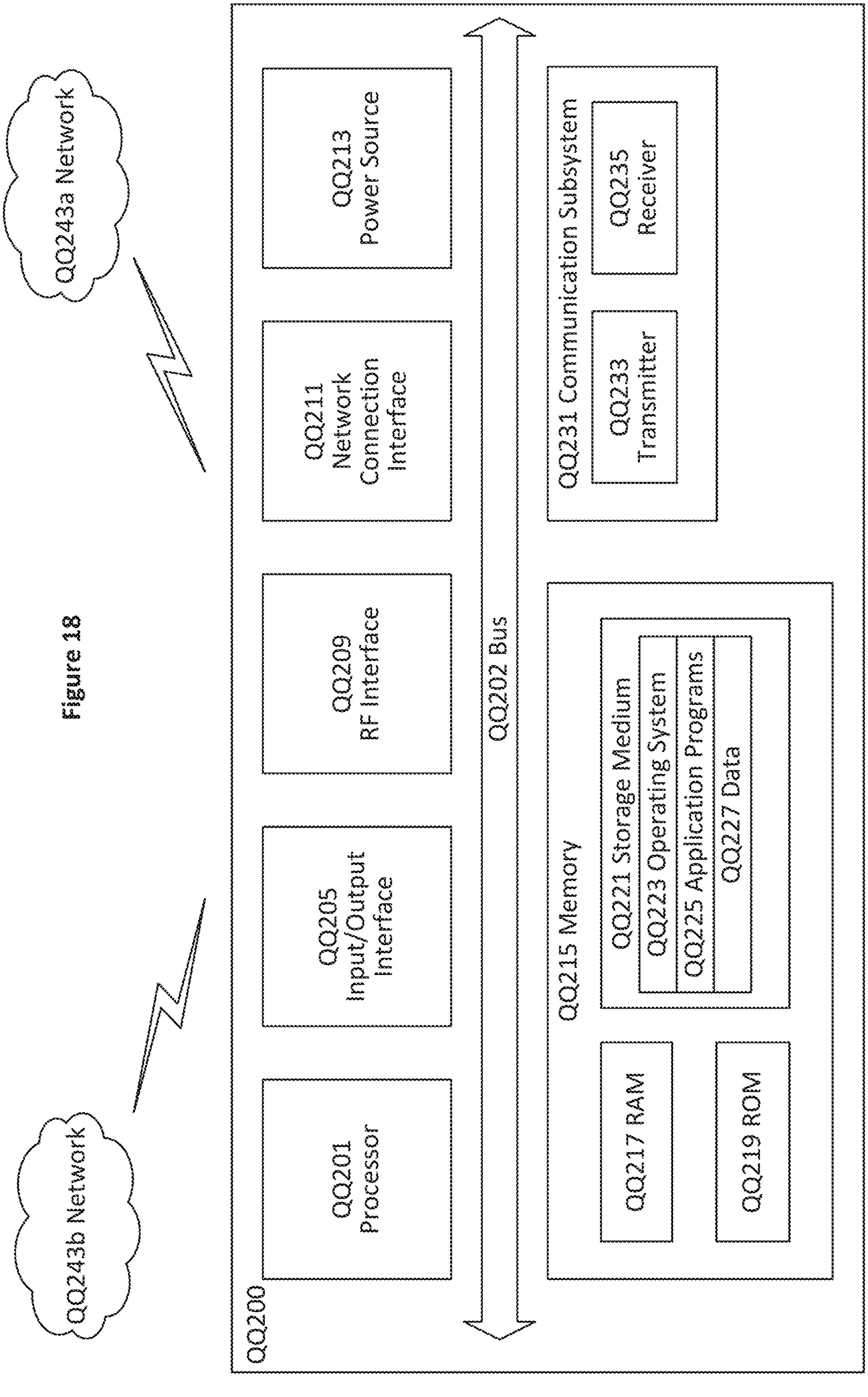
FIG. 18 is a block diagram of a user equipment in accordance with some embodiments

FIG. 18 illustrates a user Equipment in accordance with some embodiments.

FIG. 18 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 18, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 18 is a UE, the components discussed herein are equally applicable to a WD, and vice-versa.

In FIG. 18, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 18, or only a subset of the components. The level of integration between the components may vary from one UE to another UE. Further, certain UEs may contain multiple instances of a component, such as multiple processors, memories, transceivers, transmitters, receivers, etc.

In FIG. 18, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 18, RF interface QQ209 may be configured to provide a communication interface to RF components such as a transmitter, a receiver, and an antenna. Network connection interface QQ211 may be configured to provide a communication interface to network QQ243*a*. Network QQ243*a* may encompass wired and/or wireless networks such as a local-area network (LAN), a wide-area network (WAN), a computer network, a wireless network, a telecommunications network, another like network or any combination thereof. For example, network QQ243*a* may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 18, processing circuitry QQ201 may be configured to communicate with network QQ243*b* using communication subsystem QQ231. Network QQ243*a* and network QQ243*b* may be the same network or networks or different network or networks. Communication subsystem QQ231 may be configured to include one or more transceivers used to communicate with network QQ243*b*. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243*b* may encompass wired and/or wireless networks such as a local-area network (LAN), a wide-area network (WAN), a computer network, a wireless network, a telecommunications network, another like network or any combination thereof. For example, network QQ243*b* may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 19:
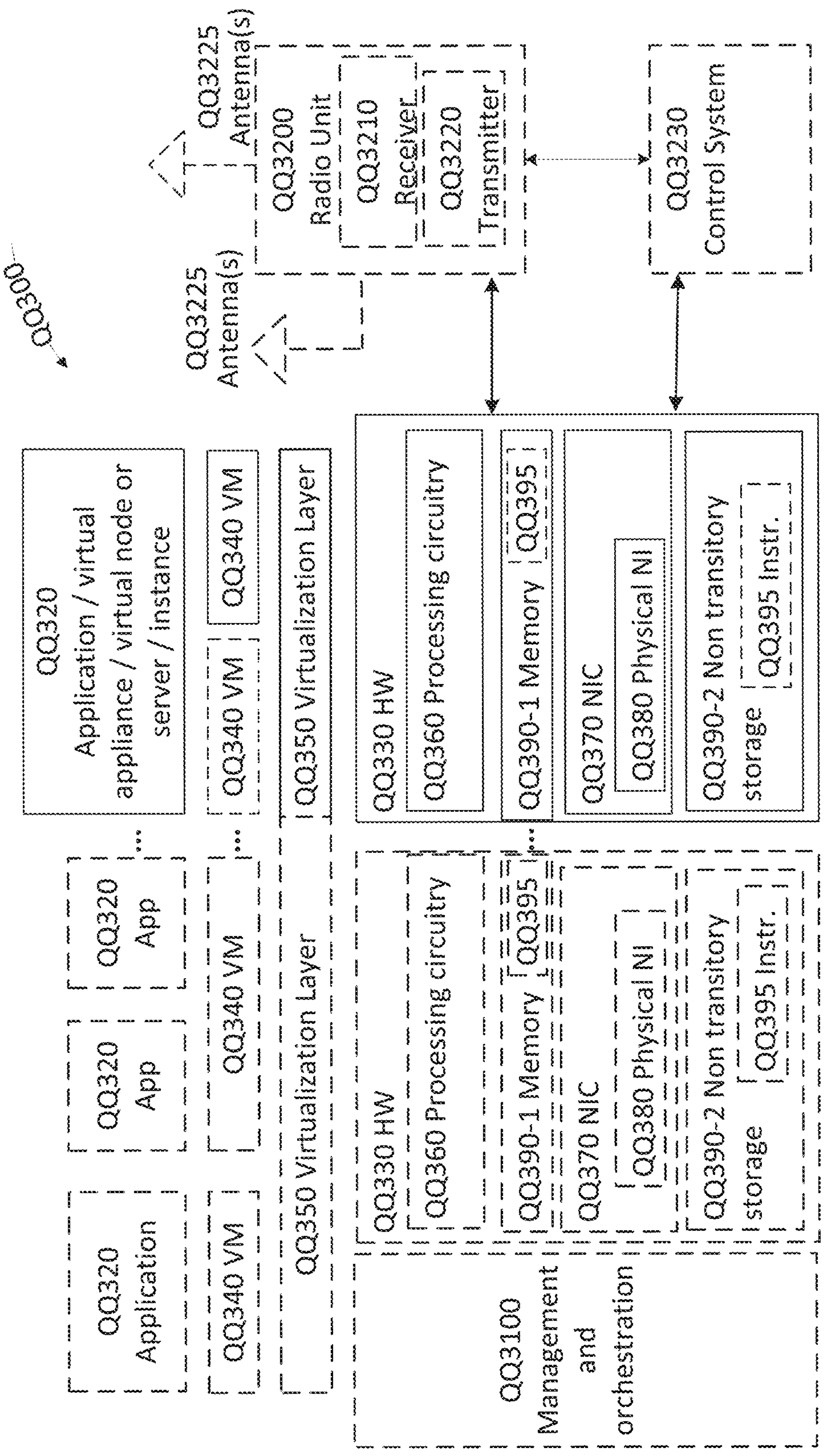
FIG. 19 is a block diagram of a virtualization environment in accordance with some embodiments.

FIG. 19 illustrates a virtualization environment in accordance with some embodiments.

FIG. 19 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 19, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 19.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signaling can be effected with the use of control system QQ3230 which may alternatively be used for communication between the hardware nodes QQ330 and radio units QQ3200.

Figure 20:
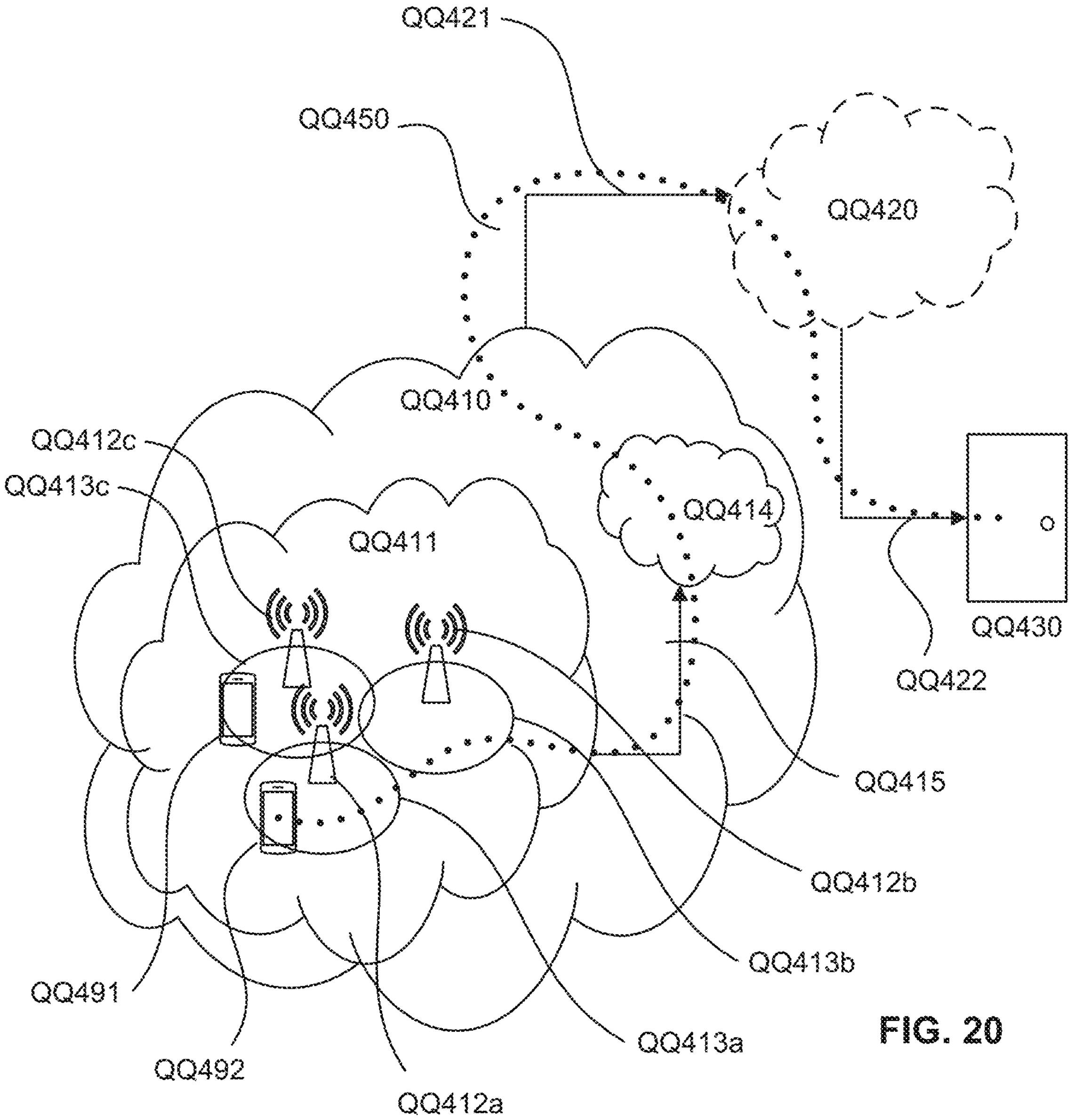
FIG. 20 is a block diagram of a telecommunication network connected via an intermediate network to a host computer in accordance with some embodiments.

FIG. 20 illustrates a telecommunication network connected via an intermediate network to a host computer in accordance with some embodiments.

With reference to FIG. 20, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412*a*, QQ412*b*, QQ412*c*, such as NBs, eNBs, gNBs or other types of wireless access points, each defining a corresponding coverage area QQ413*a*, QQ413*b*, QQ413*c*. Each base station QQ412*a*, QQ412*b*, QQ412*c* is connectable to core network QQ414 over a wired or wireless connection QQ415. A first UE QQ491 located in coverage area QQ413*c* is configured to wirelessly connect to, or be paged by, the corresponding base station QQ412*c*. A second UE QQ492 in coverage area QQ413*a* is wirelessly connectable to the corresponding base station QQ412*a*. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 20 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 21:
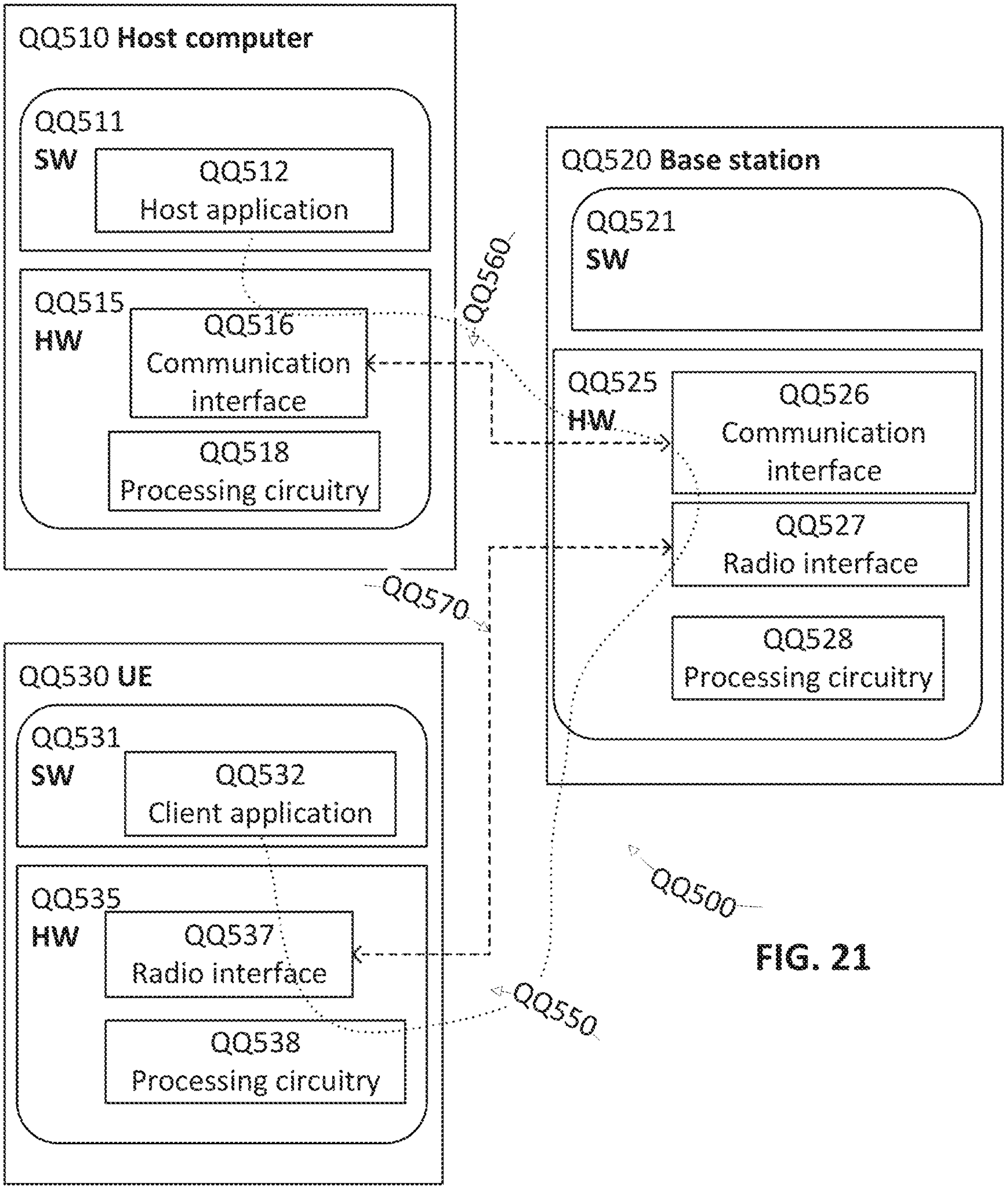
FIG. 21 is a block diagram of a host computer communicating via a base station with a user equipment over a partially wireless connection in accordance with some embodiments.

FIG. 21 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 21. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 21) served by base station QQ520. Communication interface QQ526 may be configured to facilitate connection QQ560 to host computer QQ510. Connection QQ560 may be direct or it may pass through a core network (not shown in FIG. 21) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 21 may be similar or identical to host computer QQ430, one of base stations QQ412*a*, QQ412*b*, QQ412*c* and one of UEs QQ491, QQ492 of FIG. 20, respectively. This is to say, the inner workings of these entities may be as shown in FIG. 21 and independently, the surrounding network topology may be that of FIG. 20.

In FIG. 21, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 22:
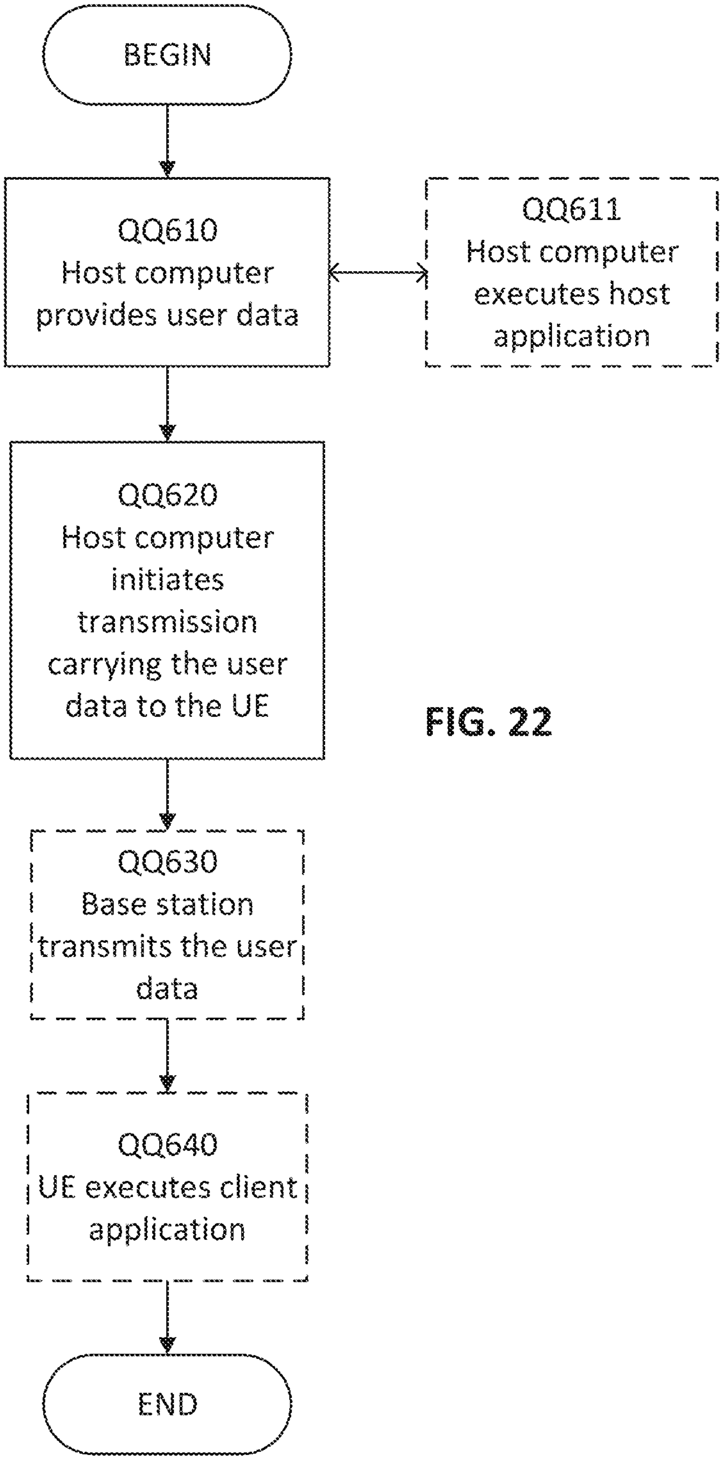
FIG. 22 is a block diagram of methods implemented in a communication system including a host computer, a base station and a user equipment in accordance with some embodiments.

FIG. 22 illustrates methods implemented in a communication system including a host computer, a base station and a user equipment in accordance with some embodiments FIG. 22 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 22 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 23:
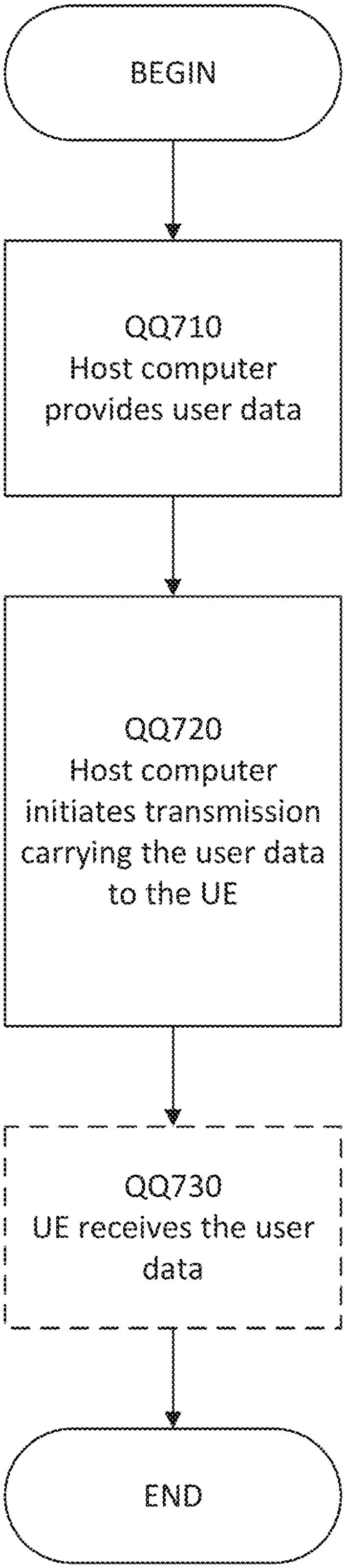
FIG. 23 is a block diagram of methods implemented in a communication system including a host computer, a base station and a user equipment in accordance with some embodiments.

FIG. 23 illustrates methods implemented in a communication system including a host computer, a base station and a user equipment in accordance with some embodiments.

FIG. 23 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 23 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 24:
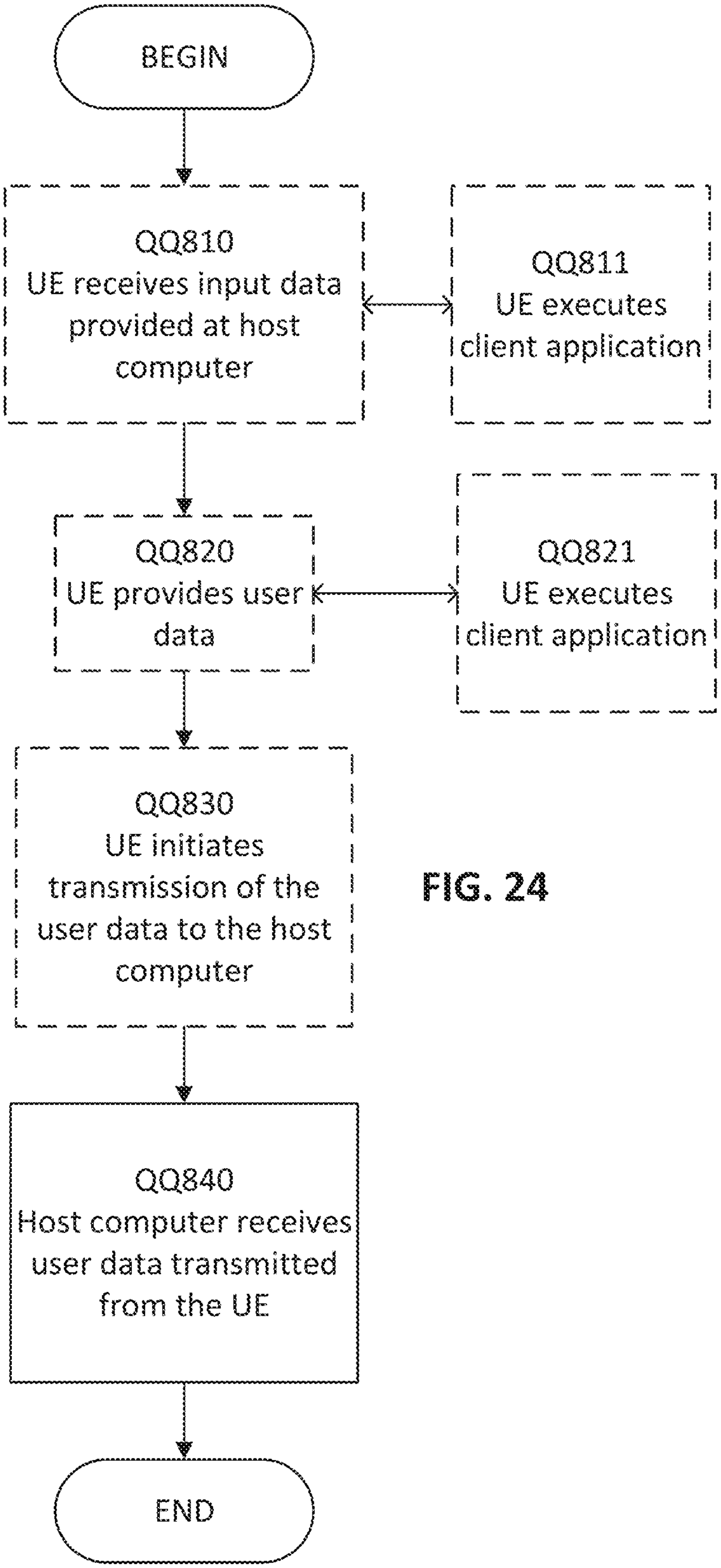
FIG. 24 is a block diagram of methods implemented in a communication system including a host computer, a base station and a user equipment in accordance with some embodiments.

FIG. 24 illustrates methods implemented in a communication system including a host computer, a base station and a user equipment in accordance with some embodiments FIG. 24 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 24 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 25:
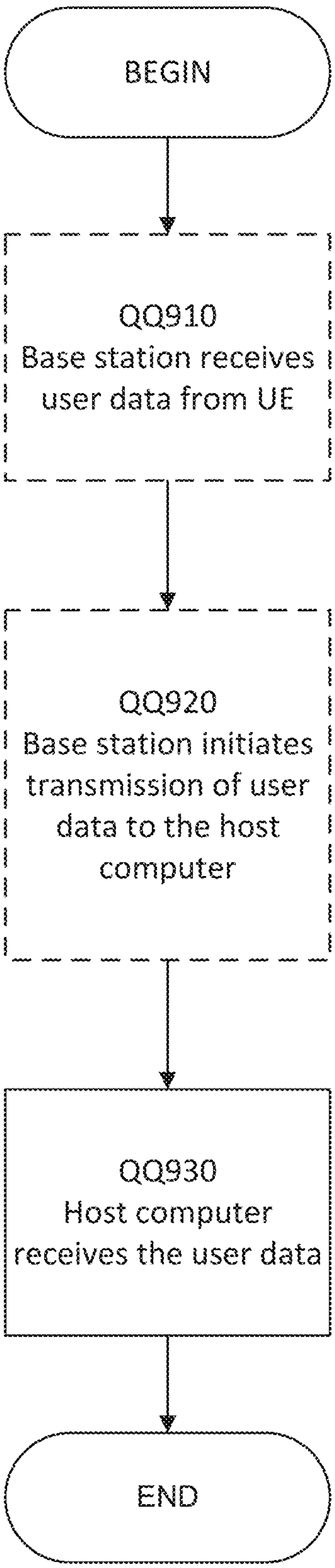
FIG. 25 is a block diagram of methods implemented in a communication system including a host computer, a base station and a user equipment in accordance with some embodiments.

FIG. 25 illustrates methods implemented in a communication system including a host computer, a base station and a user equipment in accordance with some embodiments FIG. 25 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 25 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being “connected”, “coupled”, “responsive”, or variants thereof to another element, it can be directly connected, coupled, or responsive to the other element or intervening elements may be present. In contrast, when an element is referred to as being “directly connected”, “directly coupled”, “directly responsive”, or variants thereof to another element, there are no intervening elements present. Like numbers refer to like elements throughout. Furthermore, “coupled”, “connected”, “responsive”, or variants thereof as used herein may include wirelessly coupled, connected, or responsive. As used herein, the singular forms “a”, “an” and “the” are intended to include the plural forms as well, unless the context clearly indicates otherwise. Well-known functions or constructions may not be described in detail for brevity and/or clarity. The term “and/or” (abbreviated “/”) includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms “comprise”, “comprising”, “comprises”, “include”, “including”, “includes”, “have”, “has”, “having”, or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation “e.g.”, which derives from the Latin phrase “exempli gratia,” may be used to introduce or specify a general example or examples of a previously mentioned item, and is not intended to be limiting of such item. The common abbreviation “i.e.”, which derives from the Latin phrase “id est,” may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as “circuitry,” “a module” or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

What is claimed is:

1. A method of operating a wireless device in a communication network, the method comprising:

obtaining a list of time domain resource allocations, TDRAs, from a network node of the communication network;

receiving a first downlink control information, DCI, scheduling a physical downlink shared channel, PDSCH, for reception by the wireless device, wherein the first DCI comprises a first transmission configuration indicator, TCI, codepoint indication that indicates a number of TCI states;

selecting a TDRA from the list of TDRAs based on the received DCI; and in response to the number of TCI states indicated in the first TCI codepoint indicator equaling one, determining a slot-based PDSCH transmission scheme including one or more transmission points, TRPs, based on a number of PDSCH transmission repetitions configured for the selected TDRA.

2. The method according to claim 1, wherein each TDRA of the list of TDRAs is associated with information indicating a number of PDSCH transmission repetitions configured for the TDRA.

3. The method according to claim 1, wherein each TCI state of the number of TCI states indicated in the received first DCI is associated with one of the one or more TRPs.

4. The method according to claim 1, wherein the received first DCI indicates a number of code domain multiplexed, CDM, groups associated with one or more demodulation reference signal, DMRS, ports.

5. The method according to claim 1, wherein determining the slot-based PDSCH transmission scheme comprises determining that the slot-based PDSCH transmission scheme is enabled by radio resource control, RRC.

6. The method according to claim 1, wherein determining the slot-based PDSCH transmission scheme comprises selecting the slot-based PDSCH transmission scheme from multiple different PDSCH transmission schemes used for PDSCH transmission scheduled by the received first DCI.

7. The method according to claim 1, further comprising:

receiving a second DCI scheduling a PDSCH for reception by the wireless device, wherein the second DCI comprises a second TCI codepoint indication that indicates a number of TCI states; and in response to the number of TCI states indicated in the second TCI codepoint indicator equaling two, the number of PDSCH transmission repetitions being equal to one, and the second DCI indicating one code domain multiplexed, CDM, group, determining a PDSCH transmission scheme comprising a time division multiplexed, TDM, PDSCH transmission scheme.

8. The method according to claim 1, further comprising:

receiving a second DCI scheduling a PDSCH for reception by the wireless device, wherein the second DCI comprises a second TCI codepoint indication that indicates a number of TCI states; and in response to the number of TCI states indicated in the second TCI codepoint indicator equaling two, the number of PDSCH transmission repetitions being greater than one, and the second DCI indicating one code domain multiplexed, CDM, group, determining a PDSCH transmission scheme in which multiple slot-based PDSCH transmission occasions of a same Transport Block, TB, with DMRS(s) in a single CDM group and two TCI states is used across the multiple PDSCH transmission occasions in a number of consecutive slots.

9. The method according to claim 1, further comprising:

receiving a second DCI scheduling a PDSCH for reception by the wireless device, wherein the second DCI comprises a second TCI codepoint indication that indicates a number of TCI states; and in response to the number of TCI states indicated in the second TCI codepoint indicator equaling two, the number of PDSCH transmission repetitions being greater than one, and the second DCI indicating two code domain multiplexed, CDM, groups, determining a hybrid PDSCH transmission scheme.

10. The method according to claim 1, further comprising:

receiving a second DCI scheduling a PDSCH for reception by the wireless device, wherein the second DCI comprises a second TCI codepoint indication that indicates a number of TCI states; and in response to the number of TCI states indicated in the second TCI codepoint indicator equaling two, no PDSCH transmission repetitions being configured for the selected TDRA, and the second DCI indicating two code domain multiplexed, CDM, groups, determining a first PDSCH transmission scheme in which a PDSCH is transmitted in a slot with two TCI states and multiple demodulation reference signal, DMRS, ports within two code domain multiplexed, CDM, groups.

11. The method according to claim 1, further comprising:

receiving a second DCI scheduling a PDSCH for reception by the wireless device, wherein the second DCI comprises a second TCI codepoint indication that indicates a number of TCI states; and in response to the number of TCI states indicated in the second TCI codepoint indicator equaling two, no PDSCH transmission repetitions being configured for the selected TDRA, and the second DCI indicating one code domain multiplexed, CDM, group, determining a second or third PDSCH transmission scheme, wherein the second PDSCH transmission scheme comprises a first frequency division multiplexed, FDM, PDSCH transmission scheme, and the third PDSCH transmission scheme comprises a second FDM PDSCH transmission scheme different from the first FDM PDSCH transmission scheme.

12. The method according to claim 1, further comprising:

receiving a second DCI scheduling a PDSCH for reception by the wireless device, wherein the second DCI comprises a second TCI codepoint indication that indicates a number of TCI states; and in response to the number of TCI states indicated in the second TCI codepoint indicator equaling two, no PDSCH transmission repetitions being configured for the selected TDRA, and the second DCI indicating one code domain multiplexed, CDM, group, determining a PDSCH transmission scheme comprising a time division multiplexed, TDM, PDSCH transmission scheme.

13. The method according to claim 1, further comprising:

receiving a second DCI scheduling a PDSCH for reception by the wireless device, wherein the second DCI comprises a second TCI codepoint indication that indicates a number of TCI states; and in response to the number of TCI states indicated in the second TCI codepoint indicator equaling one and one or no PDSCH transmission repetitions being configured for the selected TDRA, determining a legacy single TRP PDSCH transmission scheme.

14. The method according to claim 1, further comprising:

receiving a second DCI scheduling a PDSCH for reception by the wireless device, wherein the second DCI comprises a second TCI codepoint indication that indicates a number of TCI states; and in response to the number of TCI states indicated in the second TCI codepoint indicator equaling one and a number of PDSCH transmission repetitions for the selected TDRA being greater than one, determining a legacy single TRP PDSCH transmission scheme.

15. A wireless device comprising:

processing circuitry; and memory coupled with the processing circuitry, wherein the memory includes instructions that when executed by the processing circuitry causes the wireless device to perform operations according to claim 1.

16. A computer program product comprising a non-transitory storage medium including program code to be executed by processing circuitry of a wireless device, whereby execution of the program code causes the wireless device to perform operations according to claim 1.

17. A method of operating a radio access network node, RAN, in a communication network, the method comprising:

providing a list of time domain resource allocations, TDRAs, to a wireless device operating in the communication network, each TDRA comprising information indicating a number of PDSCH transmission repetitions configured for the TDRA;

transmitting downlink control information, DCI, for scheduling a physical downlink shared channel, PDSCH, for reception by the wireless device, the DCI indicating which TDRA from the list of TDRAs the wireless device is to select to receive the PDSCH transmissions from one or more transmission points, TRPs, operating in the communication network, wherein the DCI includes a TCI codepoint indication that indicates a number of transmission configuration indicator, TCI, states; and in response to the number of TCI states indicated in the TCI codepoint indication of the DCI equaling one, scheduling the PDSCH transmissions from the one or more TRPs according to a slot-based PDSCH transmission scheme associated with the TDRA indicated by the DCI.

18. The method according to claim 17, wherein each TCI state is associated with one of the one or more TRPs.

19. The method according to claim 17, wherein the DCI indicates a number of code domain multiplexed, CDM, groups associated with one or more demodulation reference signal, DMRS, ports.

20. A radio access network, RAN, node comprising:

processing circuitry; and memory coupled with the processing circuitry, wherein the memory includes instructions that when executed by the processing circuitry causes the RAN node to perform operations according to claim 17.

21. A computer program product comprising a non-transitory storage medium including program code to be executed by processing circuitry of a radio access network, RAN, node, whereby execution of the program code causes the RAN node to perform operations according to claim 17.

22. The method according to claim 1, wherein the determining comprises determining whether a repetition field is present in the selected TDRA; and if repetition field is present, determining another PDSCH transmission scheme based on the number of PDSCH transmission repetitions configured for the selected TDRA and a number of TCI state indicated in the first DCI.

23. The method according to claim 17, wherein the first DCI indicates the number of TCI states to influence the UE selection of a PDSCH transmission scheme from multiple different PDSCH transmission schemes used for PDSCH transmission scheduled by the first DCI.

* * * * *